(12) United States Patent
Jain et al.

(10) Patent No.: US 11,891,751 B2
(45) Date of Patent: Feb. 6, 2024

(54) LAUNDRY KIOSK

(71) Applicant: LAUNDRYSUCKS.IO INC., Atlanta, GA (US)

(72) Inventors: Nishant Jain, Atlanta, GA (US); Thibault P. Corens, Atlanta, GA (US)

(73) Assignee: LAUNDRYSUCKS.IO INC., Sandy Springs, GA (US)

( * ) Notice: Subject to any disclaimer, the term of this patent is extended or adjusted under 35 U.S.C. 154(b) by 0 days.

(21) Appl. No.: 17/632,709

(22) PCT Filed: Dec. 23, 2019

(86) PCT No.: PCT/US2019/068223
§ 371 (c)(1),
(2) Date: Feb. 3, 2022

(87) PCT Pub. No.: WO2021/025722
PCT Pub. Date: Feb. 11, 2021

(65) Prior Publication Data
US 2022/0282425 A1    Sep. 8, 2022

(30) Foreign Application Priority Data

Aug. 3, 2019    (WO) ................ PCT/US2019/045019

(51) Int. Cl.
| | | |
|---|---|---|
| *D06F 73/02* | (2006.01) | |
| *D06F 34/18* | (2020.01) | |
| *B25J 17/02* | (2006.01) | |
| *D06F 39/00* | (2020.01) | |
| *D06F 58/10* | (2006.01) | |
| *D06F 58/20* | (2006.01) | |
| *D06F 103/02* | (2020.01) | |
| *G06F 18/214* | (2023.01) | |

(52) U.S. Cl.
CPC .......... *D06F 73/02* (2013.01); *B25J 17/0258* (2013.01); *D06F 34/18* (2020.02); *D06F 39/008* (2013.01); *D06F 58/10* (2013.01); *D06F 58/203* (2013.01); *D06F 2103/02* (2020.02); *G06F 18/214* (2023.01)

(58) Field of Classification Search
CPC .. B25J 17/0258; D06F 39/008; D06F 58/203; D06F 34/18; D06F 73/02; D06F 58/10; D06F 2103/02; G06F 18/214
See application file for complete search history.

(56) References Cited

U.S. PATENT DOCUMENTS 4,728,015 A * 3/1988 Holzapfel ............... D06F 73/00
                                                            223/70
4,980,981 A * 1/1991 Naidoo ................... D06F 69/00
                                                            38/144

(Continued)

*Primary Examiner* — Benjamin L Osterhout
(74) *Attorney, Agent, or Firm* — Run8 Patent Group, LLC; Peter Miller

(57) ABSTRACT

A laundry kiosk is provided according to an aspect of the present disclosure. In an embodiment, the laundry kiosk contains a user interface component to receive laundering choices for a garment from a user and an apparatus to process the garment according to the received choices. The laundering choices include one or more of a combination of cleaning, pressing and drying. A suitable enclosure is also provided to hold the apparatus and the user interface component.

20 Claims, 18 Drawing Sheets

(56) References Cited

U.S. PATENT DOCUMENTS

| | | | | |
|---|---|---|---|---|
| 5,305,484 A * | 4/1994 | Fitzpatrick | D06F 73/02 | 68/6 |
| 5,609,047 A * | 3/1997 | Hellman, Jr. | D06F 73/00 | 68/222 |
| 5,815,961 A * | 10/1998 | Estes | D06F 73/02 | 38/14 |
| 8,464,562 B1 * | 6/2013 | Colburn | D06F 73/02 | 68/222 |
| 9,367,058 B2 * | 6/2016 | Kang | H04L 12/2825 | |
| 10,275,746 B1 * | 4/2019 | Breitman | H04L 67/306 | |
| 10,409,240 B2 * | 9/2019 | Zhang | G06Q 10/02 | |
| 10,662,578 B2 * | 5/2020 | Welch | G06Q 30/0283 | |
| 2004/0112095 A1 * | 6/2004 | Bolduan | D06F 58/10 | 68/184 |
| 2005/0115120 A1 * | 6/2005 | Cevik | D06F 73/02 | 38/14 |
| 2005/0132761 A1 * | 6/2005 | Carrubba | D06F 73/00 | 68/222 |
| 2008/0217364 A1 * | 9/2008 | Fong | D06F 59/02 | 223/89 |
| 2008/0256989 A1 * | 10/2008 | Jeong | D06F 73/02 | 392/441 |
| 2009/0302105 A1 * | 12/2009 | Cassady | D06F 95/00 | 235/381 |
| 2010/0012689 A1 * | 1/2010 | Guffey | A47G 25/20 | 223/66 |
| 2010/0251779 A1 * | 10/2010 | Zaglio | A47G 25/20 | 68/13 R |
| 2011/0030249 A1 * | 2/2011 | Rosenzweig | D06F 73/00 | 38/144 |
| 2012/0018461 A1 * | 1/2012 | Azizian | D06F 73/02 | 223/66 |
| 2012/0143708 A1 * | 6/2012 | Viviano | G06Q 30/06 | 705/16 |
| 2012/0159806 A1 * | 6/2012 | Dana | D06F 58/203 | 68/6 |
| 2012/0317729 A1 * | 12/2012 | Song | D06F 58/10 | 68/6 |
| 2013/0193171 A1 * | 8/2013 | Carter | D06F 75/12 | 68/5 R |
| 2016/0215440 A1 * | 7/2016 | Burger | D06F 73/02 | |
| 2017/0083885 A1 * | 3/2017 | Khadgi | G07F 17/20 | |
| 2017/0268156 A1 * | 9/2017 | Dana | D06F 59/02 | |
| 2019/0257024 A1 * | 8/2019 | Shin | F24F 11/00 | |
| 2020/0370236 A1 * | 11/2020 | Chae | D06F 73/00 | |
| 2021/0032797 A1 * | 2/2021 | Shin | D06F 58/10 | |

* cited by examiner

Please select laundering choices
☑ Clean
☑ Press
☑ Dry
☐ Scent
FIG. 3
Start
FIG. 4A
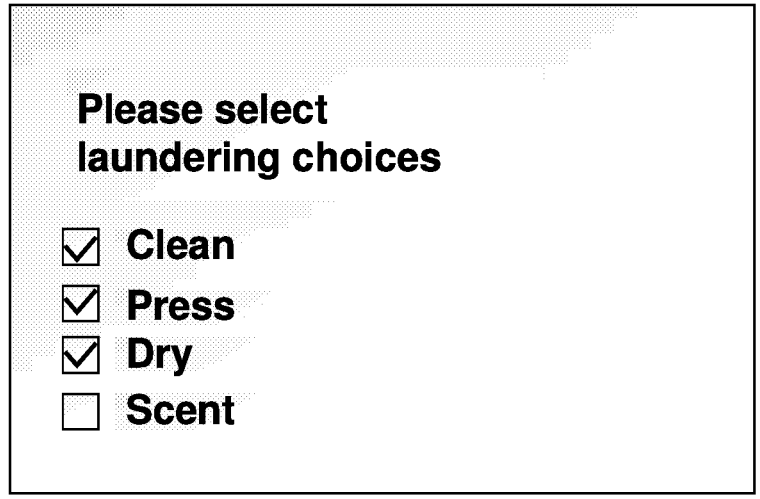
FIG. 4B

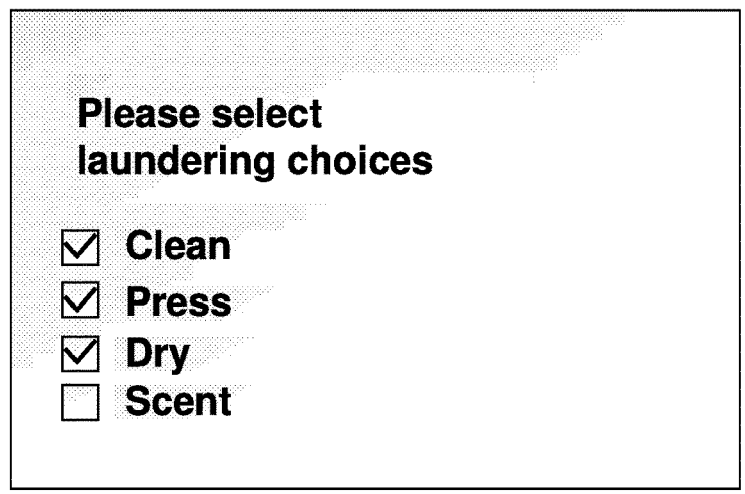
FIG. 4C
Please open door
[ Next ]
FIG. 4D
Please collect your hanger
[ Next ]
FIG. 4E
Attach hanger
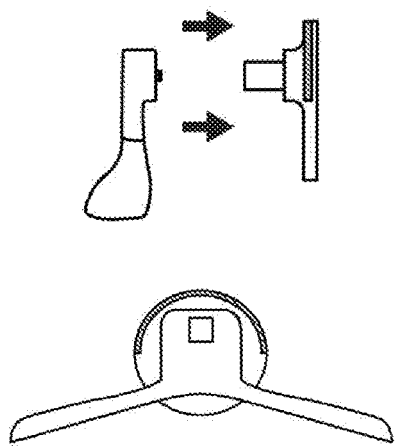
[ Next ]
FIG. 4F
Button up all buttons
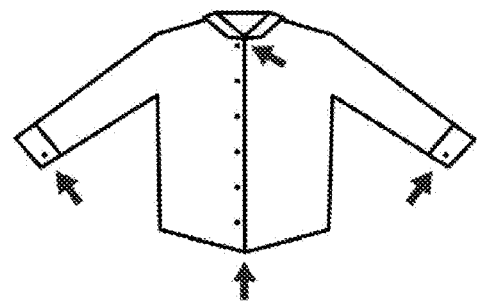
[ Skip ] [ Next ]
FIG. 4G

Slide sleeves onto pipes

Back　Skip　Next

Attach front clip

Back　Skip　Next

Attach right clip

Back　Skip　Next

Attach left clip

Back　Skip　Next

Does your shirt look like this?
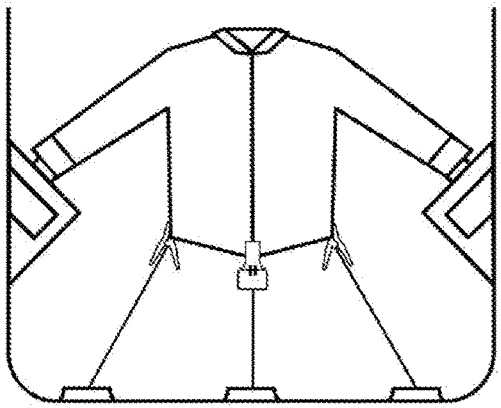
*If attached incorrectly, your shirt may still have creases after the sequence!*
[ Yes, start sequence ]
[ No, walk me through again ]
FIG. 4L
Please close door
[ Next ]
FIG. 4M
Please open door
[ Next ]
FIG. 4O
Refreshing your garment...
[ Emergency Stop ]
FIG. 4N
Done! Please check your shirt.
[ Looks good! I'd like to remove my shirt. ]
[ Extra 60s drying sequence. ]
FIG. 4P

Please remove your shirt and hanger From the machine

[ Next ]

Please close door

[ Next ]

Would you like to complete a survey and learn more about us?

[ Next ]

Thank you for using Presso!

[ Finish ]

LAUNDRY KIOSK

CROSS REFERENCE TO RELATED APPLICATIONS

This application is a US 371 National Phase entry of International Patent Application No. PCT/US19/68223, filed Dec. 23, 2019, entitled "LAUNDRY KIOSK," which is related to and claims priority from the International Patent Application Number PCT/US19/45019, entitled "LAUNDRY APPARATUS", filed Aug. 3, 2019, both of which are incorporated herein by reference in their entireties.

BACKGROUND OF THE DISCLOSURE

Technical Field

The present disclosure relates to laundry equipment used for laundering garments.

Related Art

Laundry, as used in the instant application, refers to an apparatus used for laundering objects such as garments. Laundering generally entails washing and/or cleaning, depending on the object sought to be laundered, as is well known in the relevant arts. Laundry apparatus is also normally used for drying and "pressing" (primarily for removing wrinkles) of garments.

A kiosk refers to a structure from which people can buy things or services, as is well known in the relevant arts.

BRIEF DESCRIPTION OF THE DRAWINGS

Example embodiments of the present disclosure will be described with reference to the accompanying drawings briefly described below.

FIG. 3 depicts a sample user interface provided to users of laundry kiosk for selecting laundering choices for a garment in an example implementation.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

A laundry kiosk is provided according to an aspect of the present disclosure. In an embodiment, the laundry kiosk contains a user interface component to receive laundering choices for a garment from a user and an apparatus to process the garment according to the received choices. The laundering choices include one or more of a combination of cleaning, "pressing" and drying. A suitable enclosure is also provided to hold the apparatus and the user interface component.

According to another aspect of the present disclosure, the laundry apparatus channels steam containing cleaning material towards the garment if the cleaning choice is received, but not otherwise. The laundry apparatus stretches the garment physically if the pressing choice is received, but not otherwise. The laundry apparatus channels hot gaseous material to the garment if the drying choice is received, but not otherwise.

According to another aspect of the present disclosure, the laundering choices also include scenting and if the corresponding choice is selected by the user, scent is sprayed via nozzles or included in the steam channeled towards the garment.

In an embodiment, the laundering choices further include a choice of scent type and garment type. The laundry kiosk provides a price quotation for processing the garment based on the received laundering choices and receives a payment for the price quotation before processing the garment.

According to another aspect of the present disclosure, the laundry apparatus contains a first part for cleaning the garment, a second part for pressing the garment, a third part for drying the garment and a laundry controller to control the operations of the first part, the second part and the third part based on the laundering choices received from the user.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1A:
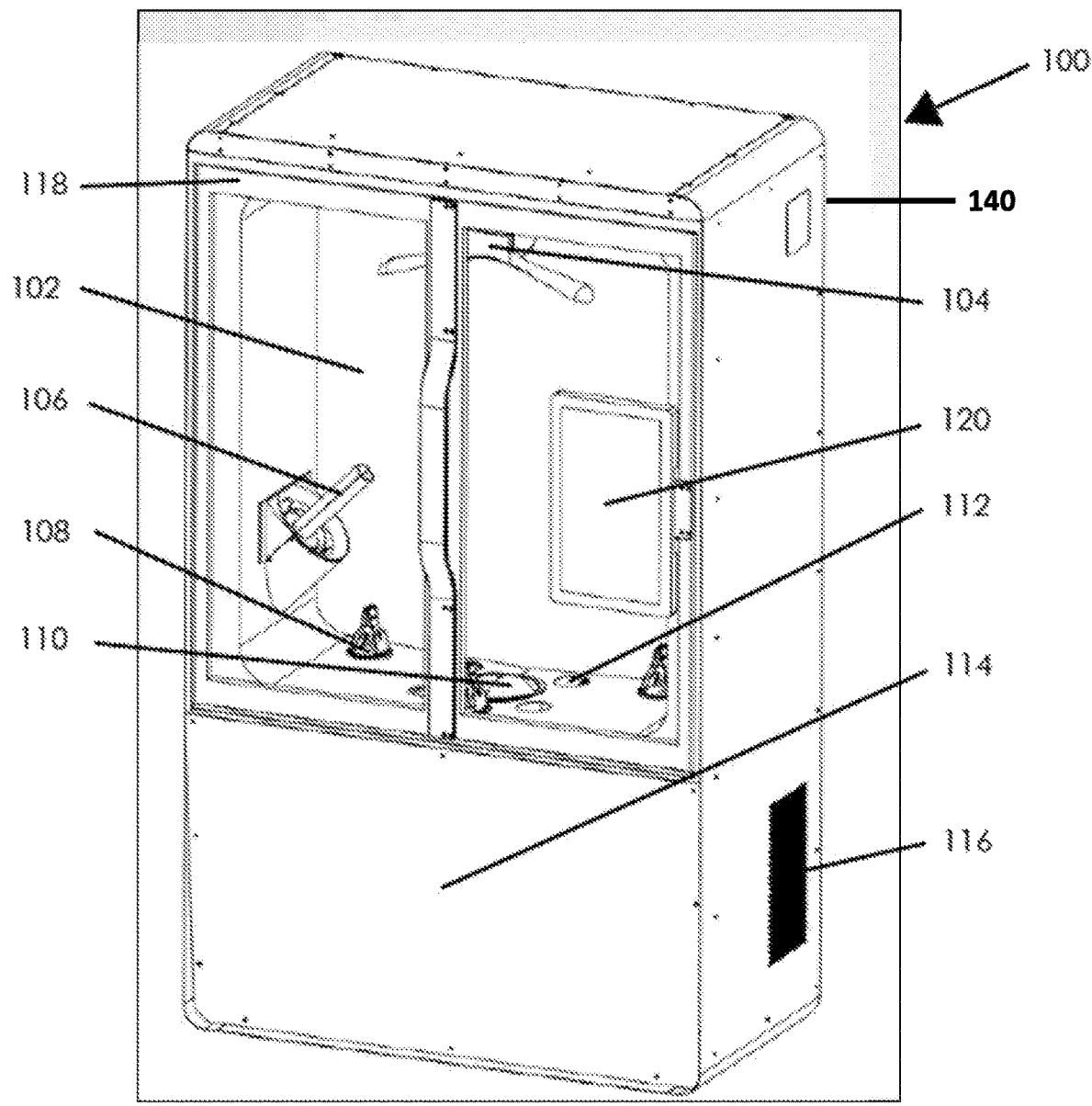
FIG. 1A is a schematic diagram illustrating an example laundry kiosk in an embodiment of the present disclosure.

FIG. 1A is a schematic diagram illustrating an example laundry kiosk 100 in an embodiment of the present disclosure. Laundry kiosk 100 is shown containing box 140 holding user interface component 120 and various physical components which together constitute the laundry apparatus. Specifically, laundry apparatus is shown containing chamber 102, hanger 104, sleeve grabber 106, clips 108, steam nozzle 110, dryer nozzles 112, steam generator assembly 114, air inlet 116 and door 118. Box 140 operates as a container to hold user interface component 120 and the various physical components of the apparatus together as a kiosk.

User interface component 120 enables the user to select various laundering choices of laundry kiosk 100 and to pay for the laundering of the garment. In an example embodiment, user interface component 120 is based on a touch screen user interface which permits users to provide inputs using touch screen and to display messages for guiding users through various usage features of kiosk 100. According to another aspect of the present disclosure, the user may install a mobile application for laundry kiosk 100. The user may then receive notifications (e.g. after processing of payment, upon completion of laundering process, discount offers, etc.) from laundry kiosk 100 on the mobile application.

Laundry kiosk 100 receives user choices from user interface component 120 and operates to process garment based on the user choices. It may be appreciated that various laundering operations are performed using only steam and normal air type gaseous material without immersion in liquids (such as water usage in conventional household washers).

Chamber 102 is an enclosed space in which garments are subjected to the laundering process. Chamber 102 contains door 118 for preventing steam and hot air (in addition to scent and cleaning material) that may be used in the laundering process from escaping out of chamber 102.

Hanger 104 facilitates hanging of the garment that is to be subjected to the laundering process.

Sleeve grabber 106 holds/grabs sleeves of the garment during the laundering process. In an example embodiment, sleeve grabber 106 also contains mechanisms for directing steam (containing cleaning material) and gases used in the laundering process into the sleeves of the garments. Though only one sleeve grabber 106 is shown in FIG. 1, laundry apparatus typically contains two sleeve grabbers 106, one for each sleeve.

Clips 108 are used for fastening the garment at various parts. Clips 108 may be connected to retractable cables that pull the clips downwards. When clips 108 connected to the retractable cables are attached to the garment, the retractable cables pull the garment attached to clips 108 downwards thereby stretching the garment. The stretching may result in reduced wrinkles and better application of laundering process.

Steam nozzle 110 is used for directing steam, or other gases and materials used in laundering process towards various parts of the garment.

Dryer nozzles 112 are used for channeling gases (gaseous matter) for drying the garment. In an example embodiment, dryer nozzles 112 channel hot air towards the garment for drying the garment. However, any other gases may be used for drying purposes.

Steam generator assembly 114 includes a steamer for generating the steam. The steamer may contain a boiler for generating the steam by boiling water. Steam generator assembly 114 may also contain heat exchangers, plumbing materials, steam valves, liquid reservoirs and electrical/electronic/mechanical circuitry to control the constituents of steam generator assembly 114.

Air inlet 116 provides the air required by steam generator assembly 114 for the laundering process.

Figure 1B:
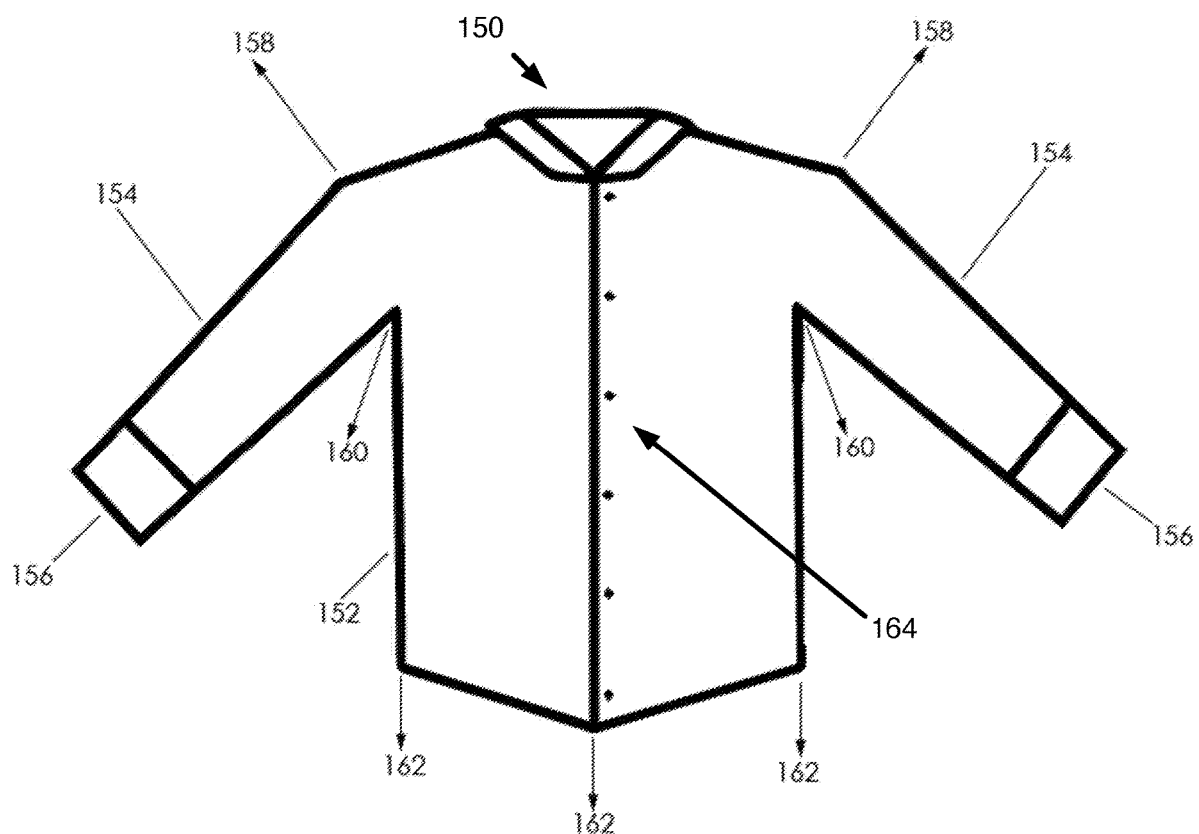
FIG. 1B depicts various parts of a garment in an example embodiment.

FIG. 1B depicts various parts of a garment 150 in an example embodiment. The garment 150 is shown containing torso 152, sleeves 154, sleeve edges 156, shoulders 158, underarms 160, seams 162 and buttons 164, which have well known meanings in the relevant arts.

Though not shown in FIG. 1A, laundry apparatus may contain various feedback circuits (for example, for controlling temperature of steam, temperature of air blown through dryer nozzles, quantity of steam, humidity/moisture in chamber 102, etc.) to appropriately process the garment sought to be laundered. Similarly, also though not shown in FIG. 1A, laundry apparatus may contain sensors, actuators and LEDs. Sensors are used for checking various states of the components of the laundry apparatus (like door open/close, hanger attached/detached). Actuators are electromechanical components used for moving or controlling parts of the laundry apparatus by receiving control signals. LEDs guide the user visually (by messages in the form of text or otherwise) through various steps of the usage process.

All such features are described below in further detail with respect to a block diagram of laundry kiosk 100 in an illustrative embodiment.

3. Block Diagram

Figure 2:
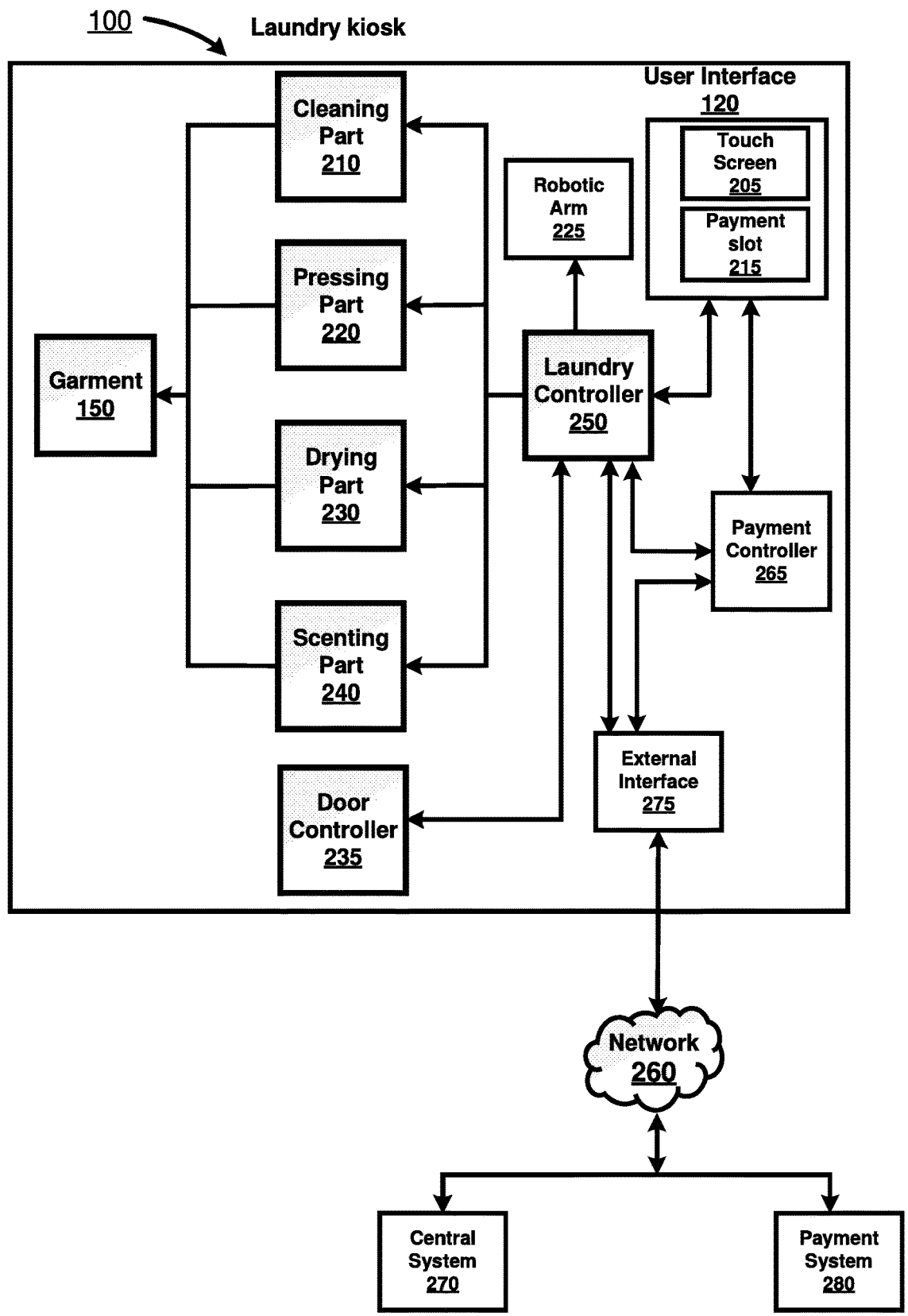
FIG. 2 illustrates a block diagram of laundry kiosk in an example implementation.

FIG. 2 is a block diagram of laundry kiosk 100 in an example implementation. It may be readily observed that there are components of FIG. 1A that precisely do not appear in FIG. 2, and vice versa. However, the correlation between such visually shown components in FIG. 1A and the blocks of FIG. 2 will be apparent to a skilled practitioner. In particular, components of FIG. 1A shown as blocks in FIG. 2 are shown with the same label and reference numeral.

FIG. 2 is shown containing laundry kiosk 100, network 260, central system 270 and payment system 280. Laundry kiosk 100 is shown containing garment 150, user interface component 120, touch screen 205, payment slot 215, payment controller 265, cleaning part 210, pressing part 220, drying part 230, scenting part 240, door controller 235, robotic arm 225, laundry controller 250 and external interface 275.

Garment 150 is to be subjected to various laundering operations as part of the laundering process based on user choices received from user interface component 120.

User interface component 120 may guide the user on how to operate the kiosk. User interface component 120 is shown containing touch screen 205 and payment slot 215. In an example embodiment, user interface component 120 is based on touch screen user interface.

Touch screen 205 enables a user to provide various laundering choices. Touch screen 205 may also display instructions and graphic animations using LEDs to visually guide the user step-by-step to set up garment 150 for the laundering process. Touch screen 205 receives instructions from laundry controller 250 to operate the LEDs.

Payment slot 215 enables the user to pay for the laundering process through various methods such as bills, coins, credit card, etc. In an embodiment, payment slot 215 may contain components like QR code for enabling digital payment as is well-known in the relevant arts.

Payment controller 265 receives user payment details from payment slot 215 and sends the same to payment system 280 and receives corresponding confirmation from payment system 280. Payment controller 265 communicates with payment system 280 via external interface 275 to complete the payment process. Upon successful completion of payment process, payment controller 265 sends the confirmation message to laundry controller 250 to start the laundering process of garment 150.

Cleaning part 210 operates to clean garment 150 using cleaning material in steam channeled towards garment 150. Cleaning part 210 may be realized based on steam generator assembly 114, steam nozzle 110, hanger 104 and sleeve grabber 106.

Pressing part 220 removes wrinkles on garment 150 by stretching garment 150 and channeling steam towards garment 150. Pressing part 220 may be realized based on steam generator assembly 114, steam nozzle 110, hanger 104, clips 108 and sleeve grabber 106.

Drying part 230 facilitates drying of garment 150 by channeling hot gaseous material towards garment 150. The hot gas is formed by heating the gas with/using the steam obtained from the steamer. Drying part 230 may be realized based on steam generator assembly 114, steam nozzle 110, dryer nozzles 112, air inlet 116 and hanger 104.

Scenting part 240 facilitates scenting of garment 150 by using scenting liquid with steam on garment 150. Scenting part 240 may be realized based on steam generator assembly 114, steam nozzle 110 and hanger 104.

Door controller 235 controls the locking and unlocking of door 118 by employing sensors (for example, solenoid) and actuators. Door controller 235 receives control signals from laundry controller 250 to operate door 118.

Robotic arm 225 attaches clips 108 on garment 150. Robotic arm 225 receives signals from laundry controller 250. The working of robotic arm 225 is described in further detail using FIGS. 5A-5D.

Laundry controller 250 controls the operation of cleaning part 210, pressing part 220, drying part 230 and scenting part 240 in order to execute the various laundering operations based on user choices. As will be clear from the description, laundry controller 250 activates operation of corresponding physical components of each part when a corresponding choice is selected. When not required by the user choices, the corresponding physical component is not activated for operation.

Laundry controller 250 also controls the mechanisms of hanger 104, sleeve grabber 106 and clips 108 to stretch garment 150.

Laundry controller 250 computes price based on laundering choices selected by the user and sends the same to payment controller 265. Laundry controller 250 receives an indication from payment controller 265 upon successful payment and starts the laundering process.

As noted above, laundry controller 250 also controls door controller 235 and robotic arm 225.

Laundry controller 250 may contain one or more microcontrollers. Laundry controller 250 may perform the controlling operations based on the instructions stored in an internal non-volatile memory (not shown).

External interface 275 facilitates the interaction of payment controller 265 and laundry controller 250 with payment system 280 and central system 270 respectively.

Network 260 provides connectivity between laundry kiosk 100 and central system 270/payment system 280, and may be implemented using protocols such as Transmission Control Protocol (TCP) and/or Internet Protocol (IP), well-known in the relevant arts. In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered.

An IP packet is said to be directed to a target system when the destination IP address of the packet is set to the IP address of the target system, such that the packet is eventually delivered to the target system by network 260. When the packet contains content such as port numbers, which specifies the destination application, the packet may be said to be directed to such application as well. The destination system may be required to keep the corresponding port numbers available/open, and process the packets with the corresponding destination ports. Network 110 may be implemented using any combination of wire-based or wireless mediums.

Central system 270 is a central server system for several kiosks such as laundry kiosk 100. Central system 270 may monitor inventory levels on laundry kiosk 100, communicate discount offers to all kiosks, use real-time data to adjust pricing, collect user feedback responses, periodically update instructions stored in laundry controller 250 (e.g. adding laundering choices for new types of garment and/or fabric, optimizing laundering parameters, updating user interface, etc.) on all kiosks, etc. Central system 270 may also control the operation of actuators (e.g. turning on/off steamer, locking/unlocking door) of laundry kiosk 100 by sending instructions to laundry controller 250.

Laundry controller 250 may send notifications to central system 270 when any of the cleaning part/pressing part/scenting part/drying part of laundry kiosk 100 malfunctions. Central system 270 may then issue troubleshooting commands and/or may notify the corresponding maintenance staff (via email/SMS or other well-known ways) for rectifying laundry kiosk 100. Central system 270 may also instruct laundry controller 250 to periodically run automated maintenance cycles and tests. Laundry controller 250 may perform the tasks and send the reports to central system 270. Laundry controller 250 may also send usage statistics (such as the number and type of garments laundered, user-selected laundering choices) to central system 270.

In an embodiment, laundry controller 250 may employ sensors (not shown) to measure the levels of water (used for generating steam), scent and cleaning material. Laundry controller 250 may receive the measured levels by appropriate communication paths (e.g., wired or wireless). Laundry controller 250 may communicate the measured levels to central system 270, which can automatically order the items (such as scent and cleaning material) as required. Alternatively or in addition, central system 270 may send notifications to the corresponding maintenance staff for replenishing the materials (specifically water type staple material) if required. Laundry controller 250 may also display the measured levels on touch screen 205.

Payment system 280 represents a server system that acts as a central payment processing unit. The interactions of laundry controller 250 with each of central system 270 and payment system 280 may be implemented in a known way.

The manner in which laundry controller 250 controls the operation of cleaning part 210, pressing part 220, drying part 230 and scenting part 240 based on the laundering choices selected by a user for a garment in an example implementation is described below in further detail.

4. Example Implementation of Laundering Process

FIG. 3 depicts a sample user interface provided to users of laundry kiosk 100 to select various laundering choices for garment 150. Specifically, FIG. 3 is shown containing the following laundering choices:

1. Clean
2. Press
3. Dry

4. Scent

When a user operates laundry kiosk 100, it is assumed that the user has selected choices 1, 2 and 3 of the above. In addition to the laundering choices listed above, it is assumed that the user has also selected a garment type and fabric type for garment 150. In an embodiment, the garment type may be one of dress shirt, T-shirt, polo, blouse, jacket, pants, etc. and the fabric type may be one of cotton, rayon, silk, linen, wool, etc. It is assumed that the user has selected "dress shirt" as the garment type and "cotton" as the fabric type and has positioned the garment ready for the laundering process.

Laundry controller 250 controls the operation of cleaning part 210, pressing part 220 and drying part 230 in order to execute laundering operations based on user choices. Laundry controller 250 does not activate operation of scenting part 240 as "Scent" option has not been selected by the user.

Laundry controller 250 may start the laundering process after receiving confirmation about payment from payment controller 265. Laundry controller 250 sends appropriate control signals to steam generator assembly 114 to start generating steam. Laundry controller 250 also sets parameters like duration of steam generation and steam temperature based on the laundering choices selected by the user. For example, for gentler garments, steam at minimal temperature may be used.

Laundry controller 250 detects that steam generator assembly 114 has generated steam at the required temperature, based on signal received from a temperature sensor. Laundry controller 250 then proceeds to clean the garment based on user-selected choice 1.

In the cleaning operation, laundry controller 250 mixes cleaning material into the steam before the steam is channeled to clean garment 150. In the illustrative embodiment, the cleaning material is a cleaning liquid like disinfectant, detergent or deodorizer.

Laundry controller 250 lets the steam generated by steam generator assembly 114 be channeled to parts of garment 150 in cleaning part 210. As the steam is channeled, the steam fills chamber 102 and the temperature of garment 150 rises to above 60 degrees Celsius leading to killing of bacteria. The steam also deodorizes garment 150 by neutralizing smelly chemical compounds. The moisture created by the steam results in cleaning of garment 150. In addition to the steam, laundry controller 250 may spray the cleaning liquid on garment 150 (especially the underarms) through steam nozzle 110 and sleeve grabber 106. Alternatively, laundry controller 250 may infuse/mix the cleaning liquid into the steam. In case of infusion with steam, laundry controller 250 infuses the cleaning liquid with the help of a mechanism (for example, using peristaltic pump) that pumps the cleaning liquid into the steam pipe close to steam nozzle 110 or sleeve grabber 106.

Laundry controller 250 enables precise control of the cleaning liquid infused into the steam by controlling the peristaltic pump. As the steam exits the steam nozzle 110, it atomizes and sprays the cleaning liquid on garment 150. It may be desirable to infuse cleaning liquid close to nozzle to prevent burning of the liquid due to high temperature of steam and clogging caused by the cleaning liquid residue in the steam tubing.

The steam makes garment 150 slightly damp, which is typically sufficient to provide a semi-immersive environment for the cleaning liquid to act on the sweat, smell and bacteria. Once the cleaning operation is complete, laundry controller 250 proceeds to start the operation of pressing part 220 as pressing is a laundering choice selected by the user.

In the pressing operation (laundering choice 2), laundry controller 250 first stretches garment 150 by sending appropriate control signals to hanger 104, robotic arm 225 and sleeve grabber 106. Thereafter, laundry controller 250 lets the steam generated by steam generator assembly 114 be channeled to parts of stretched garment 150 in pressing part 220. The steam is channeled towards garment 150 using steam nozzle 110 and sleeve grabber 106, where steam nozzle 110 generally directs the steam at torso 152 of garment 150 (can also be directed at other parts of garment 150) and sleeve grabber grabs/holds sleeves 154 at sleeve edges 156 and directs steam into sleeves 154 of garment 150.

Specifically, laundry controller 250 sends signals to the corresponding valves and actuators to expand the expandable components of hanger 104, the details of which are described below with respect to FIGS. 5A-5D. Expandable components of hanger 104 aid in stretching the seam along underarm 160 of garment 150 causing wrinkles around underarms 160 and shoulders 158 to be removed. Expandable components of hanger 104 also block the passage between sleeves 154 and torso 152 of garment 150, enabling the steam to get trapped either inside sleeves 154, aiding in better pressing of sleeves 154, or in torso 152, aiding in better pressing of torso 152. The heat and moisture from the steam resets the hydrogen bonds in the fabric that form the wrinkles into the new stretched positions, thereby rendering the garment wrinkle-free. Once the pressing operation is complete, laundry controller 250 proceeds to start drying part 230 for drying garment 150 as part of user-selected choice 3.

In the drying operation, laundry controller 250 channels hot air towards garment 150 in drying part 230. The hot air is formed by heating the air using the steam obtained from the steamer. Laundry controller 250 controls the valves to propel air from air inlet 116 towards drying part 230. Laundry controller 250 also facilitates the injection of steam from the steamer in steam generator assembly 114. The steam generated in the steamer is thus redirected by laundry controller 250 for generating hot air that is used for drying operation. Laundry controller 250 then facilitates channeling of hot air into garment 150 via dryer nozzles 112 to dry garment 150.

In an alternative scenario, it is assumed that the user has selected option 3 (Scent) as part of the laundering choices. When the user selects the "Scent" option, user interface component 120 further provides a choice of the scent (for example, Floral, Citrus, Oceanic, etc.) to be applied to garment 150. In such a scenario, laundry controller 250 proceeds to start the operation of scenting part 240 during and after the execution of all other laundering operations (such as cleaning, pressing and drying) based on the user choices.

In the scenting operation, laundry controller 250 signals a pump (not shown) in scenting part 240 to infuse scent fluid (based on the user choice of scent) along with steam/cleaning liquid into a spray nozzle. Alternatively, laundry controller 250 may spray the scent on the garment via the spray nozzle without infusing the scent into steam. Laundry controller 250 controls the volume of the scent fluid, depending on type of garment 150, by using a valve. The scent selected by the user is sprayed on garment 150 at the end of the laundering process.

In another alternative scenario, the user may select options 2 (Press) and 3 (Scent) as the laundering choices. In such a scenario, laundry controller 250 stretches garment 150 and channels steam on the stretched garment for removing wrinkles as part of the pressing operation. Laundry controller 250 also sprays scent/infuses scent fluid into the steam. However, laundry controller 250 does not spray/infuse cleaning liquid into the steam. Laundry controller 250 also does not activate operation of drying part 230.

In yet another alternative scenario, the user may select only option 4 (Dry). In such a scenario, laundry controller 250 does not stretch garment 150. Laundry controller 250 also does not infuse cleaning liquid and scenting fluid into the steam. Laundry controller 250 only activates operation of drying part 230 to dry garment 150.

Thus, laundry controller 250 controls the operation of cleaning part 210, pressing part 220, drying part 230 and scenting part 240 in order to execute laundering operations based on user choices.

It may be appreciated that garment 150 is held in a vertical position in each of the cleaning, pressing, scenting and drying operations of the laundering process.

The manner in which user interface component 120 guides the user to operate laundry kiosk 100 is described below in further detail using an example user interface.

5. Example User Interface

Figure 4H:
FIGS. 4A-4T depict sample user interfaces provided to users for making payment based on the selected laundering choices and setting up the garment for laundering.
Figure 4I:
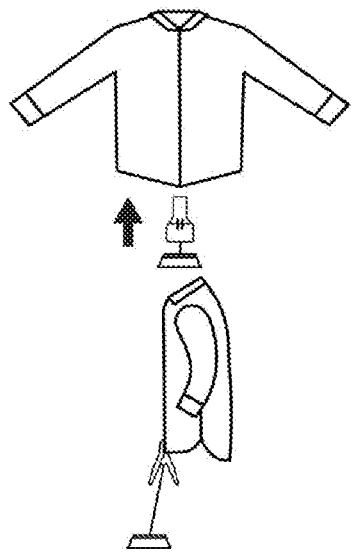
Figure 4J:
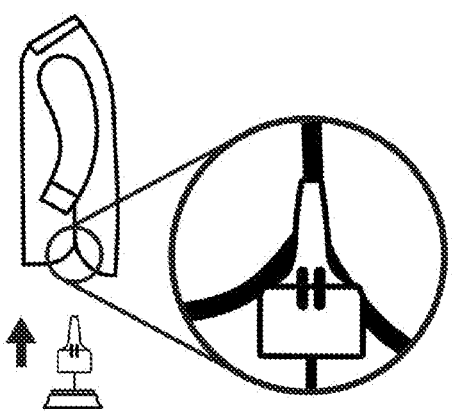
Figure 4K:
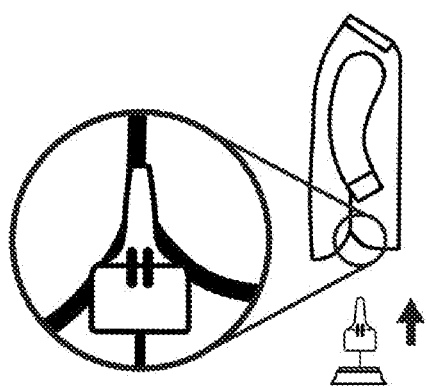
Figures 4Q, 4R, 4S, 4T:

FIGS. 4A-4T depict sample screens displayed on touch screen 205 to guide the user step-by-step to select laundering choices for garment 150, make payment and set up garment 150 for laundering process according to an example implementation.

Touch screen 205 may display one or more of the buttons "Back", "Skip" and "Next" at each step.

If the user selects "Back" button, touch screen 205 displays the previous screen in the laundering set up process. If the user selects "Skip" button, touch screen 205 displays the next screen without checking if the user has executed instructions displayed on the current screen. For example, the user may skip the step of fastening sleeves of garment 150 if garment 150 does not have sleeves.

The user selects "Next" button after executing instructions displayed on the current screen. Touch screen 205 then displays the next screen.

The above convention is followed for all screens which have one or more of the buttons.

Further, in the illustrative embodiment, it is assumed that the user does not skip any steps by selecting the "Skip" button.

Referring to FIG. 4A, laundry kiosk 100 is in an idle state, door 118 is locked and touch screen 205 displays the first screen which has company logo and "Start" button. A user begins using laundry kiosk 100 by selecting the "Start" button. When a user selects this button, options for garment type are displayed.

The garment type may be one of dress shirt, T-shirt, polo, blouse, jacket, pants, etc. It is assumed that the user selects "Dress Shirt" as the garment type as depicted in FIG. 4B.

In an alternative embodiment, touch screen 205 may display questions about the size (Large/Medium/Small), fabric type (Wool/Cotton/Nylon/Silk) and shape (Straight/Pencil/A-line/Round) of garment 150. The user selects the options most appropriate to his garment.

The user is then shown a dialog (as shown in FIG. 4C) that allows him to select various operations in the laundering process such as cleaning, pressing, scenting and drying and/or any combination of the aforementioned. In this Figure, the user is shown to have selected cleaning, drying and pressing operations, though the user may select any combination of choices (e.g., simply press, or simply dry and scent). It may be appreciated that the ability to select only a desired set of options may be particularly important in kiosk type of operations, where individual users/customers expect personal combination of choices.

As noted above, based on the laundering choices of the user, laundry controller 250 may use a corresponding set of optimal parameters for the laundering process (such as duration, steam temperature, hot air temperature, volume of cleaning liquid needed to be used with the steam, etc.). The optimal parameters will generally be apparent to a skilled practitioner. For example, a lower air temperature may be used during the laundering process for a light fabric (e.g. silk) compared to a heavy fabric (e.g. wool). Laundry controller 250 also stores these parameters in memory for use during laundering process.

In an embodiment, laundry controller 250 may receive optimal (control) parameters corresponding new types of garment and/or fabric added as part of laundering choices from central system 270. Laundry controller 250 may accordingly control various parts/actuators according to the applicable optimal parameters for the laundering process for the new garment/fabric types.

Laundry controller 250 computes a price based on the laundering choices of the user and the laundering parameters. Touch screen 205 displays the price to the user. The user selects "Next".

Touch screen 205 displays a screen (not shown) that prompts the user to select a payment method. Based on the payment method selected by the user, touch screen 205 displays further instructions on the screen that assist the user in completing the payment process. For example, if user selects card payment, the user is prompted to insert or swipe his card into payment slot 215. Payment slot 215 reads the card information and sends the card details to payment controller 265. Payment controller 265 sends the same to payment system 280 and receives corresponding confirmation from payment system 280. Payment controller 265 indicates to laundry controller 250 upon successful completion of payment process. Laundry controller 250 instructs touch screen 205 to start the process of guiding the user to set up garment 150 for laundering. Touch screen 205 displays "Next" button on the screen. The user selects "Next". Laundry controller 250 may also send a payment confirmation notification to the user on the mobile application.

Referring to FIG. 4D, touch screen 205 displays a screen that instructs the user to open door 118 of laundry kiosk 100. Touch screen 205 also sends communication to laundry controller 250 indicating that the user is ready to open door 118. Laundry controller 250 then instructs door controller 235 to disengage lock 118. Door controller 235 accordingly disengages lock on door 118.

The user opens door 118 and selects "Next". Door controller 235 detects that the user has opened door 118 and signals the same to laundry controller 250. Laundry controller 250 instructs touch screen 205 to display the next screen.

Referring to FIG. 4E, touch screen 205 instructs the user to remove hanger 104 from mounting dock. When the user retrieves hanger 104, a sensor (for example, a limit switch) detects that hanger 104 has been removed and sends the corresponding signal to laundry controller 250. Laundry controller 250 instructs touch screen 205 to flash an LED to indicate the removal of hanger 104 and to prompt the user to position garment 150 on hanger 104 as per the instructions and graphical animation, as shown in FIG. 4F. The user positions garment 150 on hanger 104 and replaces hanger 104 on the mounting dock. When this is done, a sensor detects that hanger 104 has been replaced on the mounting dock and sends a signal to laundry controller 250. Laundry controller 250 instructs touch screen 205 to turn the flashing LED to steady green, indicating that hanger 104 has been replaced. Touch screen 205 makes the flashing LED steady green.

In an alternative scenario, hanger 104 may be kept inside laundry kiosk 100 and only garment 150 may be attached or detached from hanger 104.

The user then selects "Next".

Referring to FIG. 4G, touch screen 205 displays a screen instructing the user to button up garment 150. The user buttons up all buttons 164 of garment 150 and then selects "Next".

Referring to FIG. 4H, touch screen 205 displays a screen instructing the user to place sleeves 154 around extrusions on the inside walls of laundry kiosk 100 referred to as the reverse clips.

Laundry controller 250 instructs touch screen 205 to make the LEDs located near the reverse clips flash blue to visually guide the user, supplementing the instructions displayed on the screen.

When the user places sleeves as per the instructions and selects "Next", touch screen 205 signals laundry controller 250. Once this is done, laundry controller 250 instructs touch screen 205 to make the LEDs next to the reverse clips to change to steady green.

The user selects "Next". In FIGS. 4I-4K, touch screen 205 guides the user to attach clips 108 to garment 150. Referring to FIG. 4I1, touch screen 205 displays a screen instructing the user to attach clip 108 located at the base of laundry kiosk 100 to the bottom of garment 150. Touch screen 205 also flashes LEDs in blue next to each clip to help the user locate clips 108.

When the user attaches each clip, the user selects "Next" on each of screen 4I, 4J and 4K respectively. For each attached clip, touch screen 205 sends a signal to laundry controller 250.

Laundry controller 250 reads tension on the cords attached to clip 108 using corresponding sensors. Once tension is detected on all clips, laundry controller 250 instructs touch screen 205 to make the corresponding LEDs blink green, indicating that garment 150 is in position and the laundering process is ready to begin. Touch screen 205 changes the LEDs accordingly.

In an alternative embodiment, after step in FIG. 4H laundry controller 250 may instruct robotic arm 225 to perform steps shown in FIGS. 4I-4K. Robotic arm 225 attaches clips 108 to garment 150. Touch screen 205 then prompts the user to skip steps shown in screens FIGS. 4I-4K.

After clips 108 are attached to garment 150 (either manually by the user or automatically by robotic arm 225 on receiving instructions from laundry controller 250), laundry controller 250 signals the retractable cables attached to clips 108 to pull the garment attached to clips 108 downwards thereby stretching the garment.

Referring to FIG. 4L, once the aforementioned steps are successfully completed, touch screen 205 displays a graphic that visually shows all the necessary attachment points and steps to secure garment 150 in laundry kiosk 100. Specifically, touch screen 205 asks the user if garment 150 matches the graphic in FIG. 4L.

Along with the message, touch screen 205 displays the buttons "Yes, start sequence" and "No, walk me through again".

If the user selects the "No" button, touch screen 205 displays screen in FIG. 4G to let the user start over the process of setting up garment 150.

If the user selects the "Yes" button, touch screen 205 displays a message to the user to indicate that the laundering process is about to begin and instructs the user to close the door of laundry kiosk 100 (as shown in FIG. 4M). The user closes door 118 and selects "Next". Door controller 235 locks door 118 and the user is now no longer required to engage with the system.

Referring to FIG. 4N, when the laundering process is underway, touch screen 205 displays the time left to complete the laundering process. Touch screen 205 also displays a button "Emergency Stop", for the user to possibly abort the laundering process. Laundry controller 250 may also display the ambient temperature and humidity levels (measured by corresponding sensors, not shown) on touch (display) screen 205 when the laundering process is in progress.

As part of the laundering process, laundry controller 250 controls the operation of cleaning part 210, pressing part 220, drying part 230 and scenting part 240 based on the optimized laundering parameters stored in memory. Laundry controller 250 executes the laundering operations based on the laundering choices of the user as described above.

Once the laundering process is complete, laundry controller 250 instructs door controller 235 to disengage the lock on door 118. Laundry controller 250 also instructs touch screen 205 to display the next screen. The laundry controller 250 signals actuators to turn off any components that were heated during the laundering process. Referring to FIG. 4O, touch screen 205 displays a screen that prompts the user to open door 118. Alternatively, laundry controller 250 may notify the user via Network 260 on the mobile application that the laundering process is complete.

The user opens door 118 and selects "Next". Touch screen 205 displays the next screen. Referring to FIG. 4P, touch screen 205 displays options on the screen that allow the user to check if garment 150 is dry or to run the drying operation for an additional 60 seconds.

If the user chooses to run the drying operation again by selecting the second option, the same process of closing the door, running the drying operation and then opening the door is repeated (steps shown in FIGS. 4M-4O).

If the user chooses to end the laundering process by selecting the first option, touch screen 205 displays the next screen as shown in FIG. 4Q. The user is prompted to detach the clips 108 from garment 150 and remove garment 150 from hanger 104, assisted visually by the flashing LEDs located near the clips. Once the user removes the clips, sensors detect the same and signal laundry controller 250 that tension on the clips has been released. Laundry controller 250 then instructs touch screen 205 to turn the LEDs off and to display the next screen to the user. Touch screen 205 then displays a screen (FIG. 4R) that prompts the user to close door 118.

The user closes door 118. As noted above, door controller 235 then locks door 118.

Simultaneously, touch screen 205 shows a screen (FIG. 4S) that allows the user to fill out a survey in exchange for discount vouchers. Touch screen 205 sends the responses to laundry controller 250. Laundry controller 250 then sends the responses to central system 270 via external interface 250. The user selects "Next". Touch screen 205 displays screen as shown in FIG. 4T. The user selects "Finish" button and screen of FIG. 4A is displayed.

Thus, user interface component 120 guides the user to provide various laundering choices, make payment and set up the garment for the laundering process.

It may be appreciated that laundry kiosk 100 may be placed in communal, high-visibility, high-footfall locations of hotels, conference centers, airports (for example lobby/mezzanine/snack room, etc.) and other similar places.

The description is continued with respect to the manner in which laundry controller 250 controls the mechanisms of hanger 104, sleeve grabber 106 and clips 108 in order to stretch garment 150 for pressing. Laundry controller 250 also controls mechanical components like actuators, valves and pumps to execute the laundering process based on the laundering choices selected by the user. Each of these control mechanisms is described below with respect to the corresponding Figures.

6. Control Mechanisms of Laundry Controller

Figure 5A:
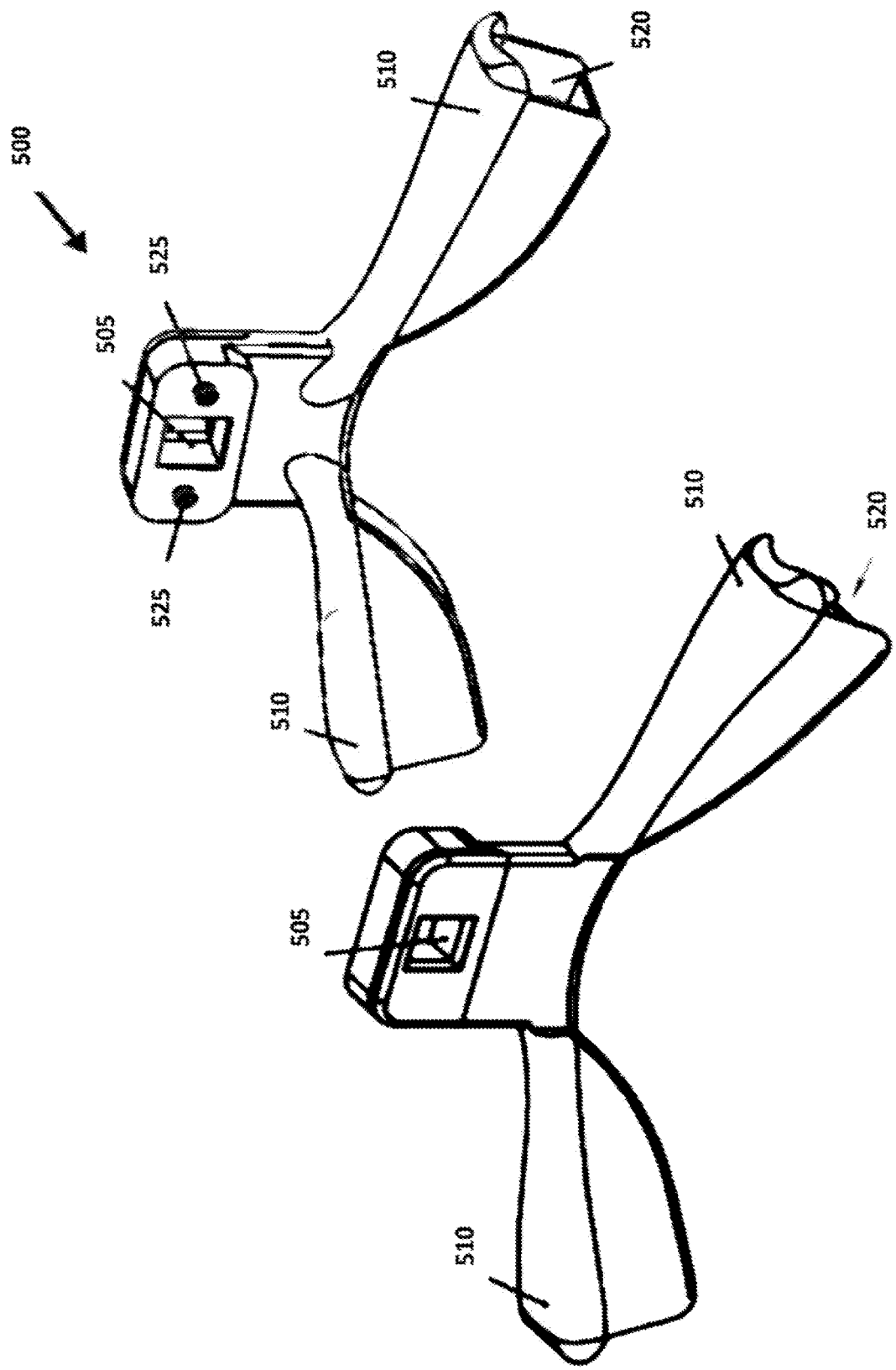
FIG. 5A depicts front and back views of hanger in an example embodiment.

FIG. 5A depicts front and back views of hanger 104 in an example embodiment. The front view of hanger 104 depicts mounting hole 505, hanger shoulders 510 and expandable component outlet 520.

Mounting hole 505 facilitates mounting of hanger 104 onto a mounting dock (depicted in FIG. 3C) which is connected to a sliding platform, the details of which are explained below with respect to FIG. 3C.

Hanger shoulders 510 facilitate hanging of garment 150. Hanger shoulders 510 contain expandable components (shown in FIG. 3B) underneath. The expandable components are in a compact state when sleeves 154 of garment 150 are initially hung from hanger shoulders 510.

As part of the laundering process, laundry controller 250 signals an actuator (not shown) to expand the expandable components. The actuator may cause the expandable components to expand by infusing a fluid into the expandable components. Laundry controller 250 controls the flow of fluid into the expandable component. Laundry controller 250 also operates to selectively inflate or deflate each of the expandable components using the actuator. The expandable components, when in compact state, stay inside hanger 104. Hanger 104 may also comprise tubes connecting the actuator to the expandable components. The expandable components, when expanded, come out of expandable component outlets 520 (as shown in FIG. 5A), the details of which are explained below.

Laundry controller 250 uses a feedback sensor (such as a pressure measuring valve) to determine when the expandable components are fully expanded (as the pressure rises when the expandable component expands against the fabric of garment 150) and fully retracted (when balloons are completely hidden from the user and pulled into the tubes).

In an example implementation, the expandable components are balloons, the fluid is air and the actuator is an air pumping device.

The back view of hanger 104 depicts valves 525 in addition to mounting hole 505, hanger shoulders 510, and expandable component outlets 520. Laundry controller 250 controls valves 525 which in turn control the flow of fluid into/out of expandable components placed underneath hanger shoulders 510.

Figure 5B:
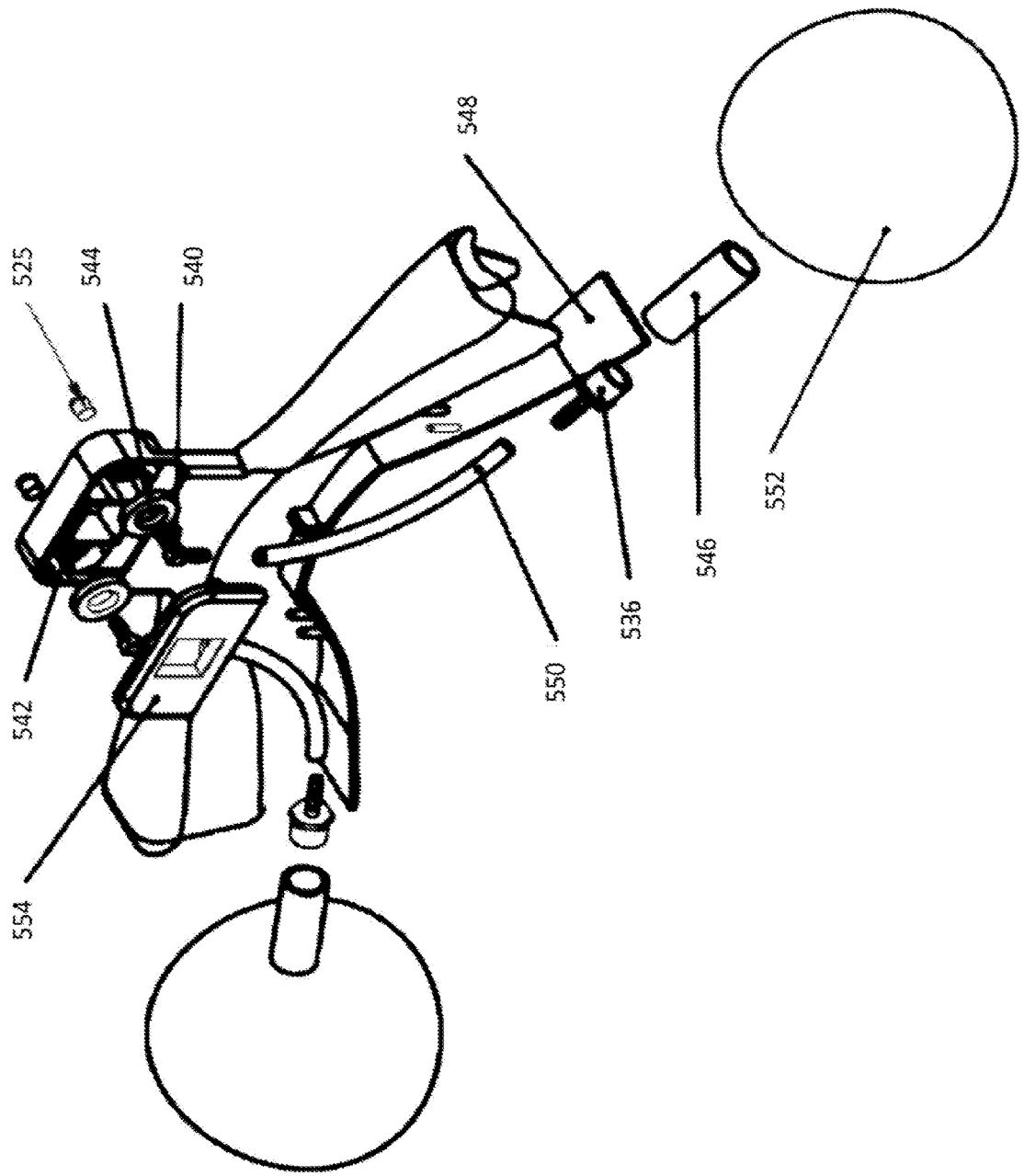
FIG. 5B depicts an exploded view of the structure of hanger in an example embodiment.

FIG. 5B depicts an exploded view of the structure of hanger 104 in an example embodiment. FIG. 5B is shown depicting hanger shell top cover 534, plastic orifice connection piece 536, valves 525, plastic elbow connection piece 540, fluid connection pipe 542, ring magnets 544, expandable component mounting pipe 546, hanger shell bottom cover 548, fluid hose 550, and expandable component 552.

Figure 5C:
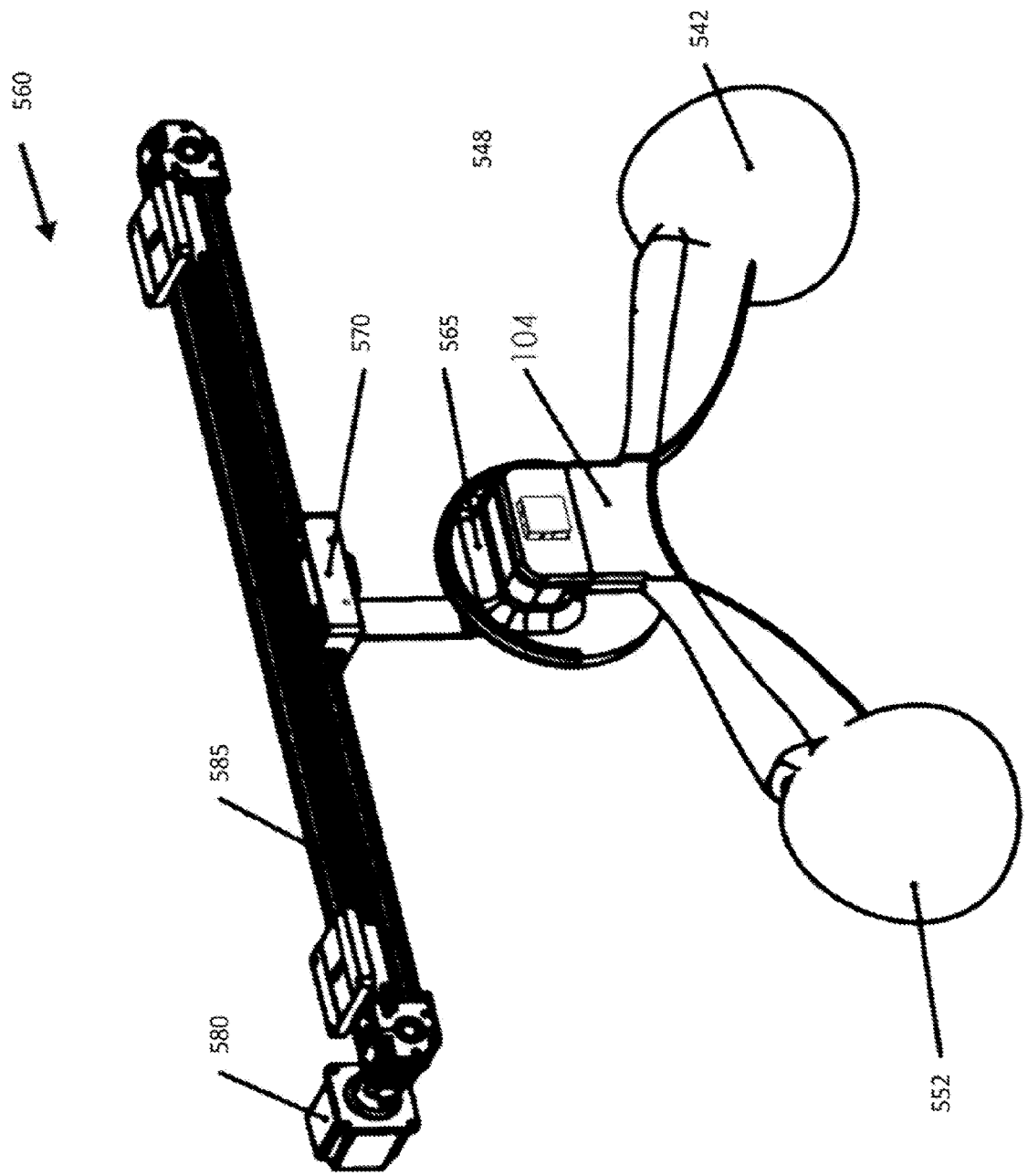
FIG. 5C depicts mechanism for linear sliding of hanger in an example embodiment.

Valves 525 connect hanger 104 to the actuator (that infuses fluid into expandable components on receiving signal from laundry controller 250) via mounting dock 565 (shown in FIG. 5C). When hanger 104 is mounted on mounting dock 565, laundry controller 250 sends signal to a poking device on mounting dock 565 that opens valves 525. Valves 525, when opened, allow fluid to freely flow between the actuator and expandable components 552, plastic elbow connection piece 540, fluid connection pipe 542, ring magnets 544, expandable component mounting pipe 546 and fluid hose 550. When hanger 104 is detached from mounting dock 565, laundry controller 250 sends signal to the poking device to close valves 525. Valves 525 then remain closed and prevent the fluid to flow out from or into expandable components 552.

FIG. 5C depicts mechanism 560 for linear sliding of hanger 104 in an example embodiment. FIG. 5C is shown containing hanger 104 with expandable components 552 expanded, mounting dock/hanger dock 565, linear sliding platform 570, stepper motor 580 and linear movement timing belt module 585.

Laundry controller 250 controls the operation of stepper motor 580 and linear movement timing belt module 585 which together cause the sliding of linear sliding platform 570. The operation of the combination of stepper motor 580 and linear movement timing belt module 585 to achieve linear movement of linear sliding platform 570 is well known in the relevant art. Linear sliding platform 570 contains mounting dock/hanger dock 565 on which hanger 104 can be docked on to. When docked on to mounting dock 565, hanger 104 gets attached to linear sliding platform 570, thereby enabling sliding of hanger 104 (along with linear sliding platform 570) using the combination of stepper motor 580 and linear movement timing belt module 585.

Mounting dock 565 contains magnets for settling hanger 104 in the correct location.

Laundry controller 250 signals 2 poking devices that are located on mounting dock 565 to push valves 525 that make the connection from hanger 104 to the hanger docking station. This facilitates the flow of fluid (such as compressed air) to flow through the tubing into expandable components 552 (such as balloons). Expandable components 552 are situated in a location that allows sleeves 154 to be shut off from torso 152 (which will aid in the pressing of sleeves). Expandable components 552 aid in stretching the seam along underarm 160 of garment 150 causing wrinkles around underarms 160 and shoulders 158 to be removed. Expandable components 552 also block the passage between sleeves 154 and torso 152 of garment 150, enabling the steam to get trapped either inside sleeves 154, aiding in better pressing of sleeves 154, or in torso 152, aiding in better pressing of torso 152.

Figure 5D:
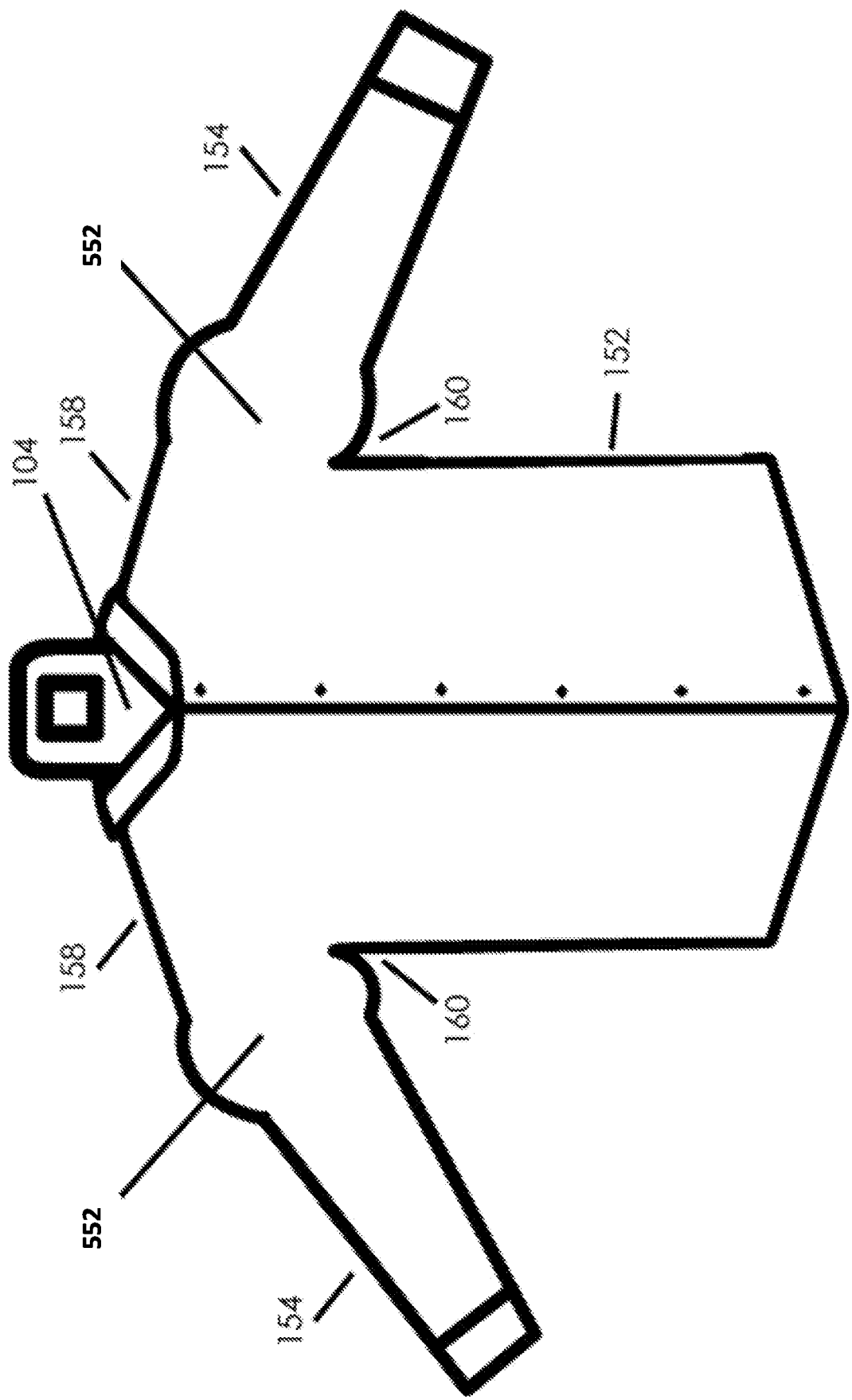
FIG. 5D depicts garment hanging on hanger with expandable components inflated in an example embodiment.

FIG. 5D depicts garment 150 hanging on hanger 104 with expandable components 552 inflated/expanded in an example embodiment. As may be readily observed from FIG. 5D, expandable components 552, when expanded/inflated, expand into sleeves 154 thereby closing the passage between sleeves 154 and torso 152 of garment 150 (i.e., by closing the gap between shoulders 158 and underarms 160 of garment 150).

When steam is channeled into sleeves 154 with expandable components 552 expanded/inflated, expandable components 552 block the steam from escaping into torso 152 from sleeves 154 and the blocked steam removes wrinkles in sleeves 154.

The description is continued below with respect to the manner in which laundry controller 250 controls the mechanism of sleeve grabber 106.

Figure 6A:
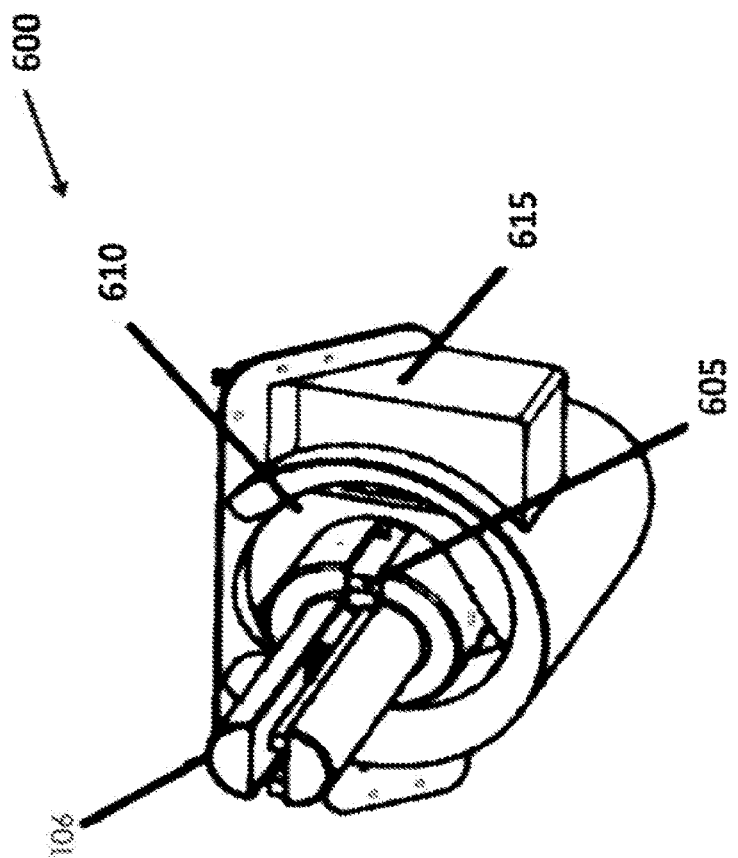
FIG. 6A depicts example implementation of sleeve grabber assembly containing sleeve grabber in contracted state.
Figure 6B:
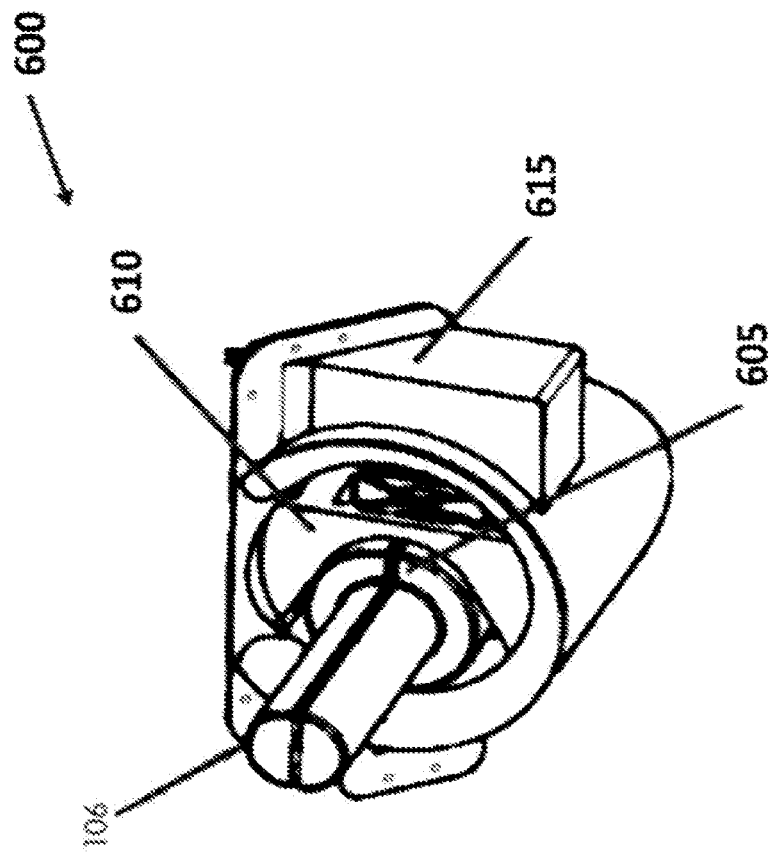
FIG. 6B depicts example implementation of sleeve grabber assembly containing sleeve grabber in expanded state.

FIGS. 6A and 6B depict example implementation of sleeve grabber assembly 600 containing sleeve grabber 106 in contracted state and expanded state respectively.

Sleeve grabber assembly 600 of FIG. 6A is shown containing sleeve grabber 106 with base 605, clamp 610 and holder 615. As may be readily observed from FIG. 6A (and as clearly labeled in FIG. 6C), sleeve grabber 106 consists of two sides. Sleeve grabber 106 contains expandable components (for example, springs) at base 605 (as shown in FIG. 6B). The expandable components exert force to push the two sides of sleeve grabber 106 apart. Clamp 610, when closed, keeps the two parts of sleeve grabber 106 together, thus maintaining sleeve grabber 106 in a contracted state. When clamp 610 is opened, the expandable components inside sleeve grabber 106 push the two sides of sleeve grabber 106 apart, thus resulting in an expanded state of sleeve grabber 106, as shown in FIG. 6B. It may be observed that FIG. 6B depicts expandable component 620.

In one alternative embodiment, the expandable component is a pneumatic balloon that would be expanded using a fluid to move the two sides of sleeve grabber 106 apart, after clamp 610 is opened.

In another alternative embodiment, sleeve grabber 106 does not contain any expandable component and the two parts of sleeve grabber 106 are moved apart using mechanical force generated by a motor and a mechanical gear assembly inside sleeve grabber 106.

Holder 615 houses a mechanical linear rail assembly that moves the clamp 610 linearly closing or opening the sleeve grabber 106.

Laundry controller 250 controls the opening or closing of sleeve grabber 106 by sending appropriate control signals to clamp 610/holder 615.

Figure 6C:
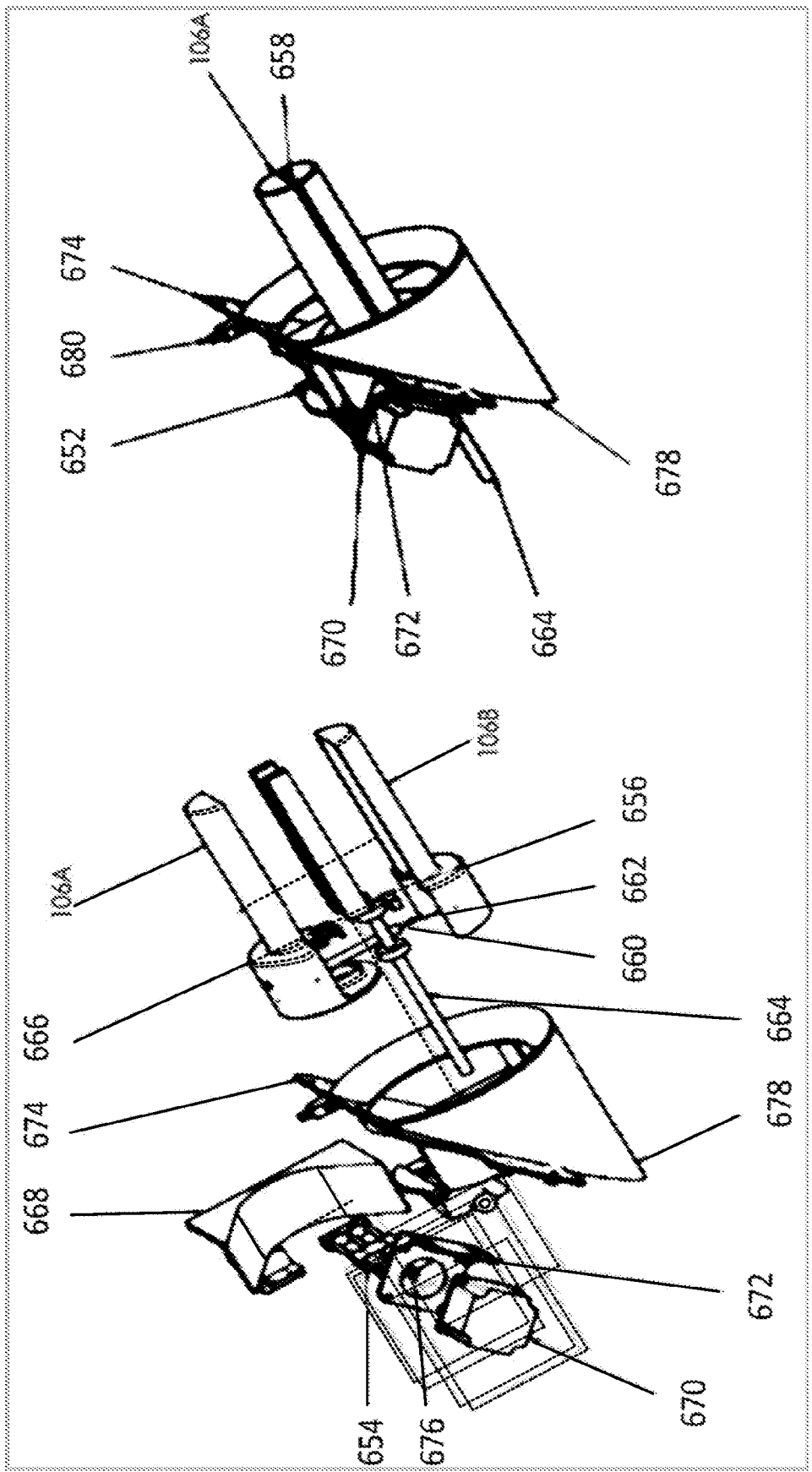
FIG. 6C depicts normal and exploded views of sleeve grabber assembly in an example embodiment.

FIG. 6C depicts normal and exploded views of sleeve grabber assembly 600, in an example embodiment. FIG. 6C is shown depicting clip holder sliding rail 652, clip holder sliding platform 654, sleeve grabber side-A 106A, sleeve grabber side-B 106B, accordion short cover 656, accordion side covers 658, sliding piston inner rod 660, sliding piston body 662, steam tube 664, bearings 666, clip holder left claw 668, Nema 23 motor 670, motor bracket 672, clip holder base plate 674, shaft connector 676, clip holder cover 678, limit switch 680.

Sliding rail 652 is used to keep the sliding rail in place. Clip holder sliding platform 654 is the actual sliding rail. Sleeve grabber side-A 106A and side-B 106B are two sides of sleeve grabber 106. These two sides are used to grab/hold onto sleeves 154 of garment 150 from inside when they are in expanded state (i.e., when sides A and B are pushed apart).

Accordion short cover 656 and accordion side covers 658 are useful in containing the steam from leaking out of sleeve grabber 106 during grabbing mechanism.

Sliding piston inner rod 660 and sliding piston body 662 facilitate sliding of sleeve grabber side-A 106A and side-B 106B away and towards each other (with the help of the springs). Piston inner rod 660 goes inside the piston body 662. Piston body 662 goes over piston inner rod 660.

Steam tube 664 guides the pressurized steam from the steamer/boiler through sleeve grabber 106 (and the grabbing mechanism) into sleeves 154 of the garment 150.

Bearings 666 allow sleeve grabber 106 to rotate around its axis. This allows sleeves 154 to get unraveled/untwisted when put on twisted, so that when sleeves 154 are being ironed, no creases get developed.

Clip holder left claw 668 presses and releases sleeve grabber 106 open/closed as the sliding rail 652 pushes it back and forth. This makes sleeve grabber 106 get a hold/or release the sleeves of the garment.

Laundry controller 250 sends signals to clip holder left claw 668 to open/close sleeve grabber 106.

Nema 23 motor 670 drives the rail system back and forth (to move clip holder). Motor bracket 672 attaches Nema 23 motor 670 to clip holder base plate 674. Shaft connector 676 connects the Nema 23 motor 670 to the clip holder sliding platform 654 enabling it to move linearly. Limit switch 680 limits the movement of the clip holder sliding platform 654 upon receiving instructions from laundry controller 250. Limit switch 680 sends a signal back to the laundry controller 250. Clip holder cover 678 covers the mechanism from an outside view. Limit switch 680 facilitates a point of reference for the rail system.

Though not shown in the figures, sleeve grabber assembly 600 also contains a retractable cable connecting sleeve grabber 106 to a retractable box.

In an example embodiment, sleeve grabber 106 is placed/inserted into sleeve 154 from sleeve edge 156 and then clamp 610 is opened upon receiving instructions from laundry controller 250. When clamp 610 is opened, expandable components (springs) inside sleeve grabber 106 (at base 605) exert force on the two sides of sleeve grabber 106 (i.e., side-A 106A and side-B 106B) and push them apart (to expand), as shown in FIG. 6B. When the two sides of sleeve grabber 106 are pushed apart/expanded, they grab/hold sleeve 154 of garment 150.

The expandable component (balloon) on one side (for example, right side) is selectively expanded/inflated based on the instructions received from laundry controller 250. The inflated balloon closes the passage between the right sleeve and torso 152 of garment 150.

Simultaneously, laundry controller 250 controls the movement of hanger 104.

Hanger 104 is moved in the direction opposite to the side on which the balloon is inflated (i.e., left side) by moving linear sliding platform 570 using the combination of stepper motor 580 and linear movement timing belt module 585, which results in pulling sleeve grabber 106 on the right side out of holder 615. With this, sleeve grabber 106 experiences two opposing forces, one from garment 150 pulling sleeve grabber 106 out of holder 615, and another from the retractable cable that is pulling sleeve grabber 106 back into holder 615. These two opposing forces result in stretching the right sleeve of garment 150 along the length of the sleeve. Also, bearings 666 allow sleeve grabber 106 to rotate around its axis which allows right sleeve of garment 150 to get unraveled/untwisted automatically. The stretching and untwisting also result in de-wrinkling of garment.

If the steam is channeled into the right sleeve with the balloon on the right side inflated, the inflated balloon blocks the steam from escaping into torso 152 of garment 150, thereby forcing the steam to inflate the sleeve completely, stretching out all the wrinkles, and then to escape/infuse through the fabric of the right sleeve. This leads to removal of wrinkles in the right sleeve.

The same process can be repeated for de-wrinkling the left sleeve. Hanger 104 is brought back to the center upon receiving instructions from laundry controller 250 and the steam is applied to torso 152 of garment through steam nozzle 110 for a few minutes.

In an alternative example embodiment, hanger 104 is first moved in one direction and then the balloon in the opposite direction is made to inflate.

The description is continued below with respect to the manner in which laundry controller 250 controls the operation of drying part 230.

Figure 7:
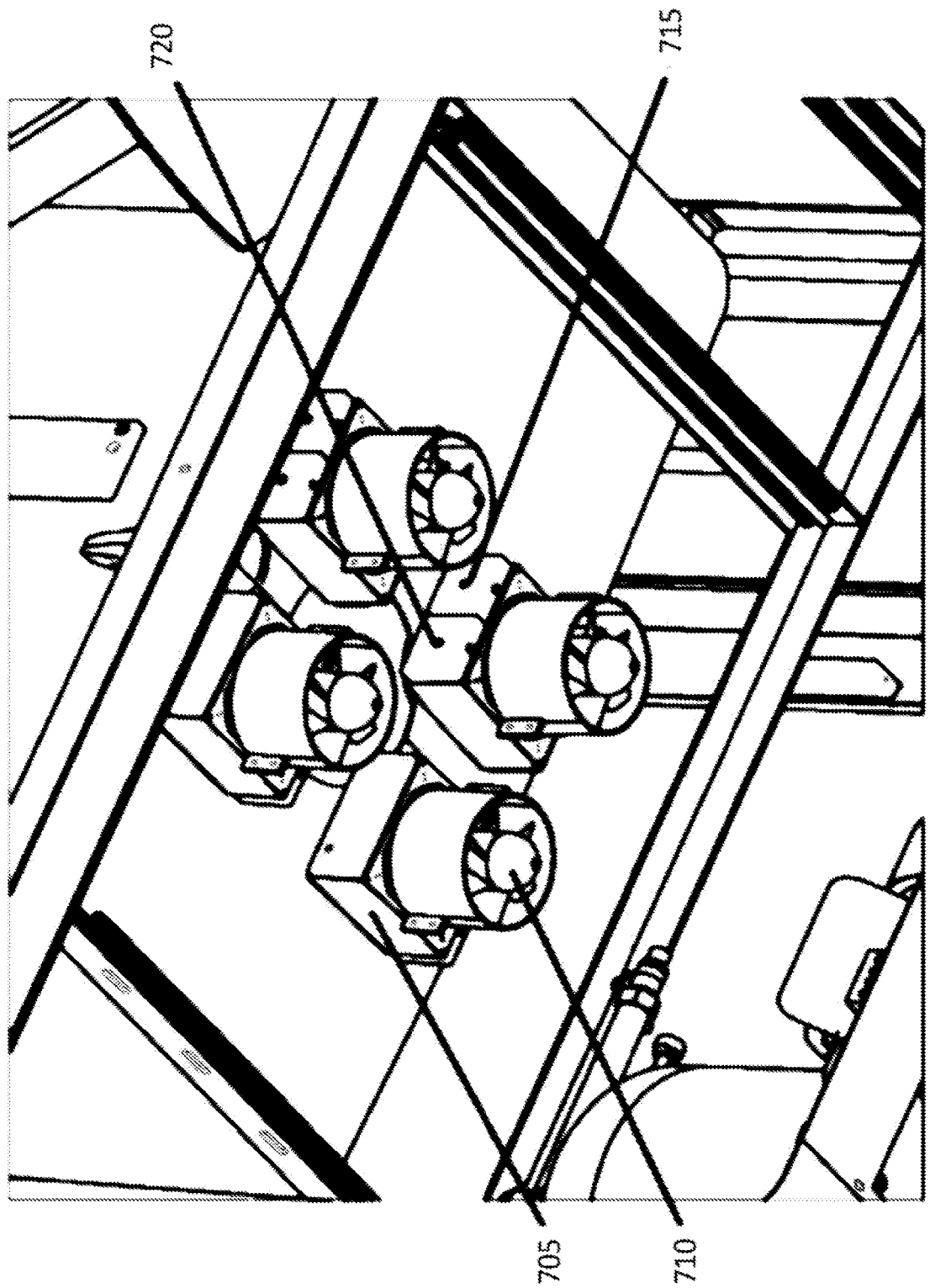
FIG. 7 depicts drying part in an embodiment of the present disclosure.

FIG. 7 depicts drying part 230 in an embodiment of the present disclosure. FIG. 7 is shown containing 4 dryers, each dryer containing heat exchanger 705, inlet ducted fan 710, steam inlet 715 and steam outlet 720.

Heat exchanger 705 facilitates transfer of heat between steam and air.

Inlet ducted fan 710 propels air through heat exchanger 705 and the air gets heated when it flows through heat exchanger 705. Inlet ducted fan 710 also facilitates channeling the hot air into garment 150 via dryer nozzles 112, as the air propelled through heat exchanger 705 pushes out the hot air. In alternative embodiments, the dryer may employ various mechanisms for collecting the hot air from heat exchanger 705 and for directing the hot air into garment 150 via dryer nozzles 112. Though not shown in the Figure, heat exchanger 705 may employ suitable techniques (such as solid walls) to prevent mixing of the steam and the air.

Steam inlet 715 facilitates injection of steam into heat exchanger 705 from the steamer in steam generator assembly 114 upon receiving instructions from laundry controller 250. The steam generated in the steamer meant for cleaning and pressing operations is redirected to heat exchanger 705 for generating hot air that is used for drying process. Upon heat exchange in heat exchanger 705, the steam may get condensed into water.

Steam outlet 720 facilitates redirection of the steam coming out of heat exchanger back to the steamer or to steam nozzle 110. Also, steam outlet 720 facilitates redirection of water formed due to condensation back to the steamer.

Thus, the existing stored heat energy in the form of steam in the steamer is used to create the heat required for generating hot air by redirecting the steam through heat exchanger 705. This results in less power consumption and thereby making the laundry apparatus more energy efficient.

Though 4 dryers are shown in FIG. 7, more or a smaller number of dryers may be employed based on the requirement.

Furthermore, though FIG. 7 depicts heat exchange between the steam and the air in heat exchanger 705, heat exchanger 705 may suitably be adapted to facilitate heat exchange between any fluids (for example, between hot water from the steamer and the air, or between the steam from the steamer and any other gas propelled by inlet ducted fan 710) as will be readily apparent to a person skilled in the art.

The description is continued below with respect to the manner in which laundry controller 250 controls the mechanism of steam nozzle 110.

Steam nozzle 110 in the laundry apparatus is the main outlet for pressurized steam and cleaning liquids that aid in the laundering processes of garment 150. According to an aspect of the present invention, steam nozzle 110 has two axes of movement, thereby enabling movement in a spherical plane.

Figure 8:
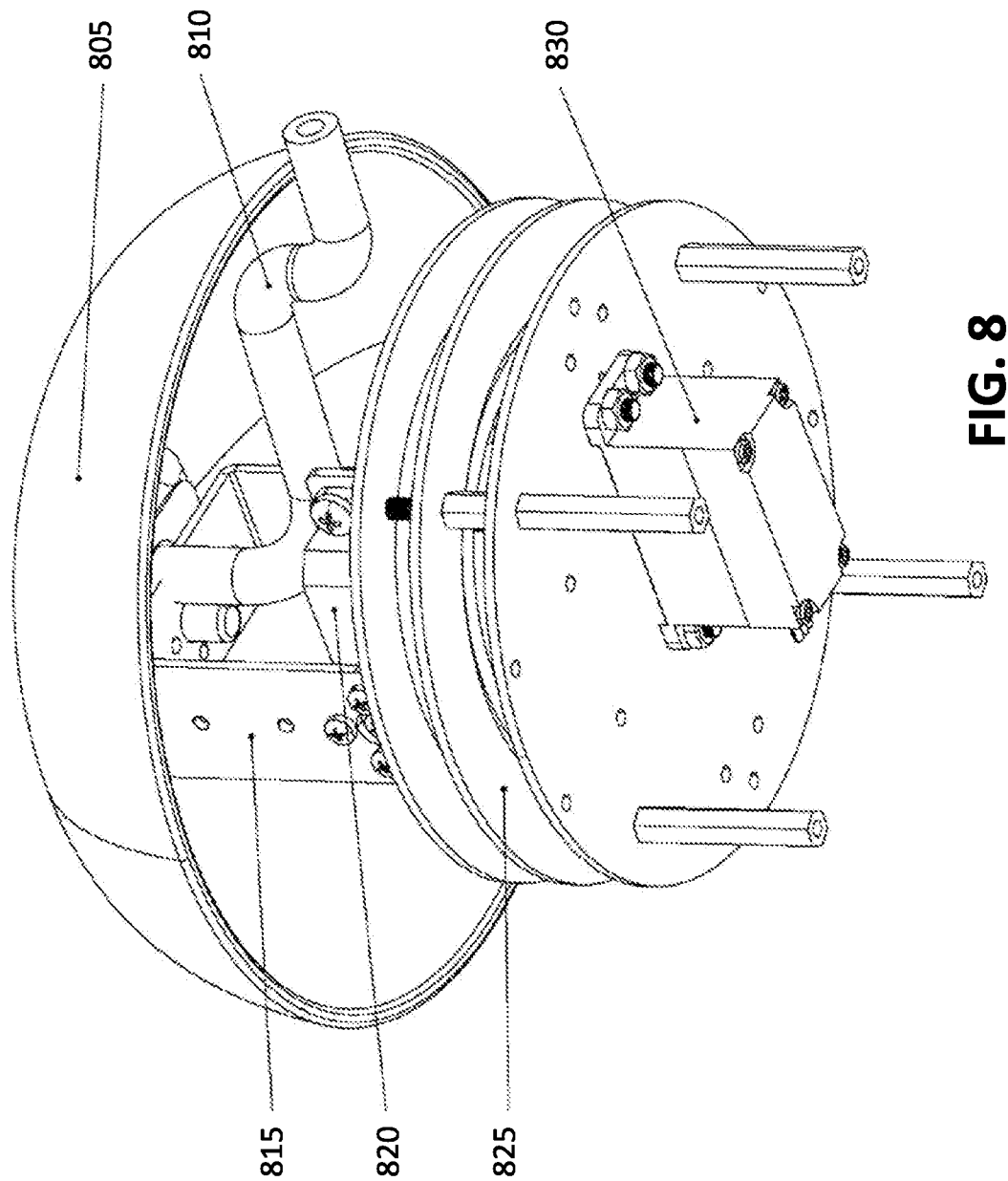
FIG. 8 depicts steam nozzle in an embodiment of the present disclosure.

FIG. 8 depicts steam nozzle 110 in an embodiment of the present disclosure. FIG. 8 is shown containing top cover shell 805, steam hose 810, swivel mounting bracket 815, top servo 820, servo mounting base 825 and bottom servo 830. The two-servo assembly as depicted in FIG. 8 enables steam nozzle 110 to move in a spherical plane. This allows directing steam and liquid in any direction. Top cover shell 805 shields the servos (servo motors) from water damage. Also, top cover shell 805 provides for aesthetics. Steam hose 810 provides the steam to be directed towards garment 150. Swivel mounting bracket 815 connects top servo 820 to top cover shell 805 enabling top servo 820 to turn top cover shell 805 in clockwise or anti-clockwise direction. Servo mounting base 825 connects bottom servo 830 to top servo 820 enabling bottom servo to turn top servo 820 in clockwise or anti-clockwise direction. The clockwise/anti-clockwise movement is controlled by laundry controller 250.

The description is continued below with respect to the manner in which laundry controller 250 automates the mechanism of clips 108.

Figure 9A:
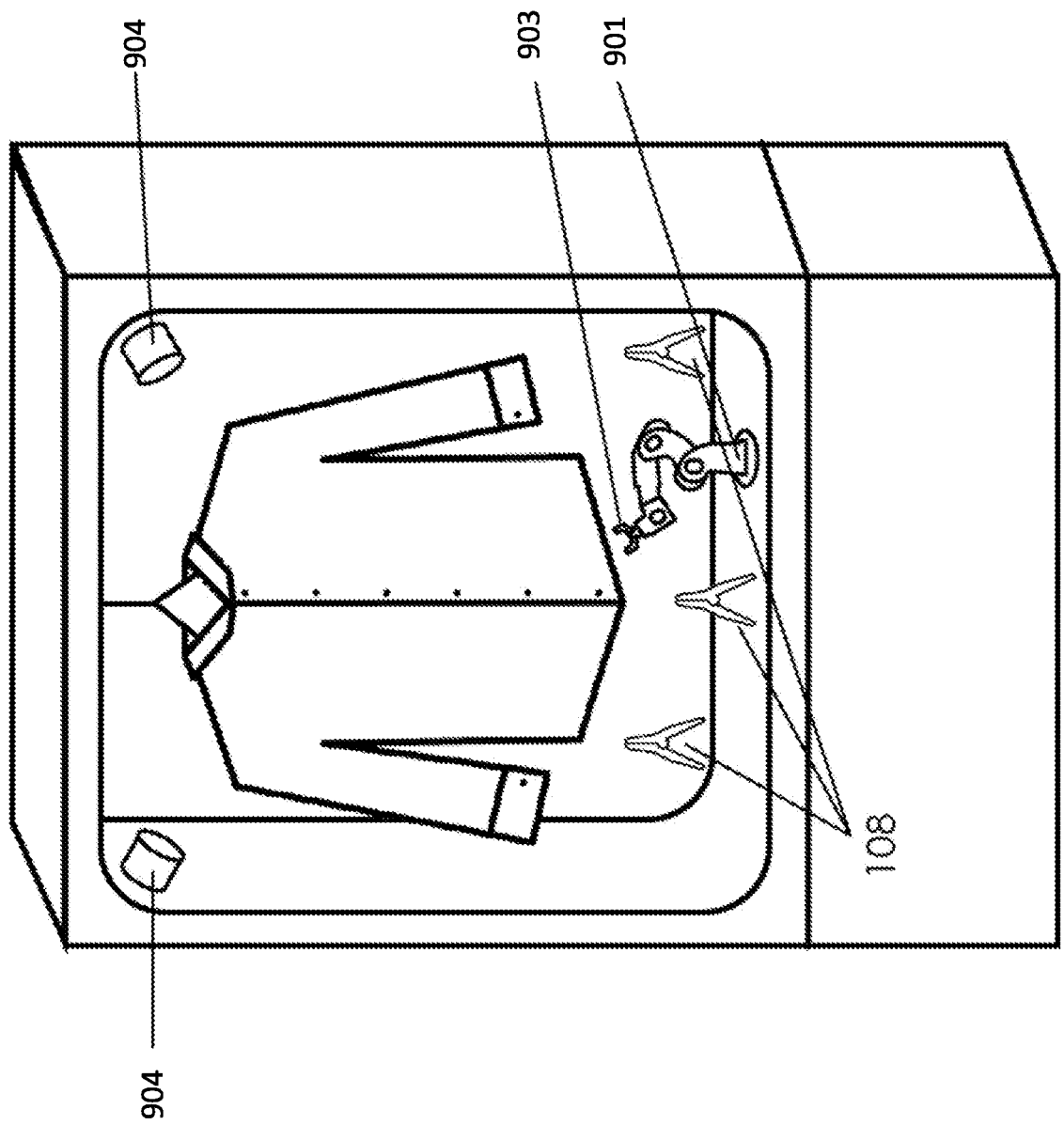
FIGS. 9A and 9B depict automation of the process of attaching clips.
Figure 9B:
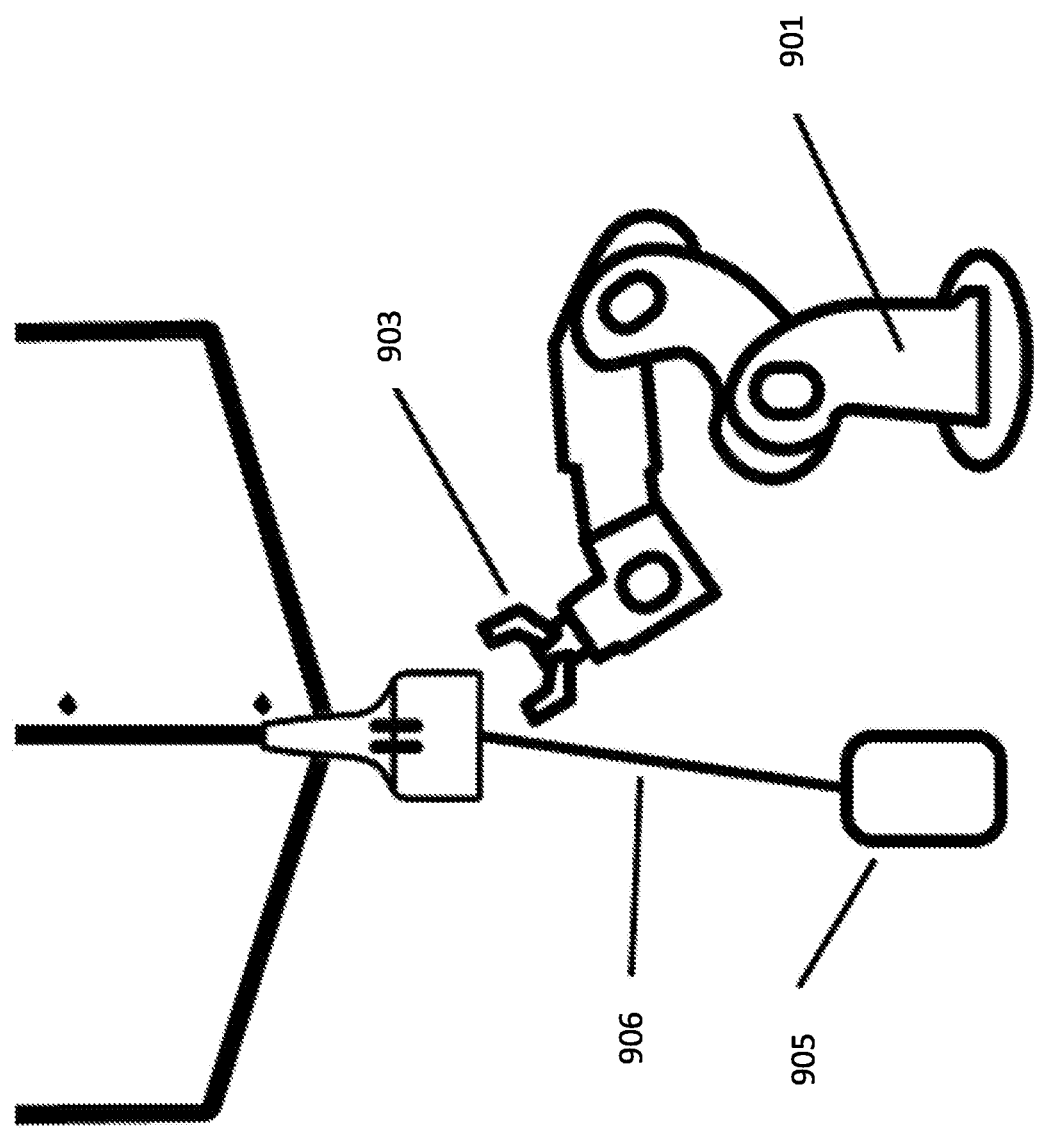

FIGS. 9A and 9B depict automation of the process of attaching clips 108 at seams 162 (or at any other points) of garment 150 in an embodiment of the present disclosure. FIG. 9A is shown containing robotic arm 701, clips 108, end effector 703 and cameras 704.

Robotic arm 901 attaches clips 108 on garment 150. In an example implementation, robotic arm 901 has 6 degrees of freedom. However, robotic arm 901 with other degrees of freedom may also be used. Robotic arm 901 has an end effector 703 that that aids in attaching clips 108 by compressing them into open position.

Cameras 904 are used to visualize garment 150 by taking images and/or videos. The images or videos taken by cameras 904 are processed by one or more processors (not shown in the Figure) connected to cameras 904.

The processing involves use of various image processing algorithms to recognize the points at which clips 108 need to be attached in garment 150. The one or more processors may be connected to machine readable media. The one or more processors may perform image processing techniques based on appropriate instructions stored on a non-volatile machine-readable medium such as a non-volatile ROM. The one or more processors may also contain main memory (such as RAM).

The image processing techniques used by the processor may include use of edge detection algorithms and pattern recognition algorithms. Also, the processor may use Infrared lighting illumination technique that illuminates garment 150 based on difference in thickness. The thicker the fabric, the darker the color registered by cameras 904. Using an array of infrared lights, the edge detection algorithm will be able to clearly recognize seams 162 of garment 150 since seams 162 typically have multiple layers of fabric and extra threading/stitches. Robotic arm 901 can then be guided by a 3D manipulation and reverse kinematics algorithm to correctly attach clips 108 to garment 150.

Above noted image processing techniques may also be used to identify wrinkles in garment 150 as clips 108 are attached and retractable cables 906 attached to clips 108, stretch the garment. As cameras 904 record data of how the clip positions and attachments affect the wrinkles, the data is fed into a machine learning model that, with enough data, will be able to optimize the positioning and attachment of clips 108 for all types of garments, thereby improving the quality of ironing as more and more garments subjected to laundering processes using the laundry apparatus.

The processor calculates the position and angle at which clips 108 need to be attached based on image processing techniques explained above, and calculates the trajectory of robotic arm 901 to place the clips at determined positions on garment 150.

FIG. 9B depicts further details of the process of attaching clips 108 in an embodiment of the present disclosure. FIG. 9B depicts clips 108 as being connected to retractable cable box 705 via retractable cable 906. Clips 108 are pulled down by retractable cable 906, on receiving instructions from laundry controller 250, thus pulling garment 150 at the points of attachment. The pull stretches garment 150, thereby aiding in better application of laundering processes and also removal of wrinkles.

Thus, laundry controller 250 controls various mechanical components to complete the laundering process based on the laundering choices selected by the user. It may be further appreciated that the user interface component and the various physical components of the laundry apparatus described above operate together as a single unit to provide the operations of cleaning, pressing, drying and scenting of the garment based on the laundering choices selected by the user.

7. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A laundry kiosk comprising:
an enclosure;
a hanger arranged within the enclosure and configured to receive a garment;
a left sleeve retainer:
   arranged:
      within the enclosure;
      below the hanger; and
      proximal a left side of the enclosure; and
   configured to:
      clamp a left sleeve of the garment; and
      tension the left sleeve of the garment against the hanger;
a right sleeve retainer:
   arranged:
      within the enclosure;
      below the hanger; and
      proximal a right side of the enclosure;
   configured to:
      clamp a right sleeve of the garment; and
      tension the right sleeve of the garment against the hanger;
a steam nozzle:
   arranged below the hanger;
   interposed between the left sleeve retainer and the right sleeve retainer;
   configured to expel a first jet of steam along a nozzle axis toward an interior surface of the garment to:
      tension a local area of the garment; and
      release wrinkles within the local area of the garment; and
an actuator configured to traverse the nozzle axis of the steam nozzle across the interior surface of the garment.

2. The laundry kiosk of claim 1:
further comprising a steam generator configured to deliver steam to the steam nozzle; and
wherein the actuator is configured to:
   rotate the steam nozzle in a circular motion about two axes, orthogonal to the nozzle axis, to sweep the first jet of steam across the interior surface of the garment.

3. The laundry kiosk of claim 1:
further comprising a steam generator configured to deliver steam to the steam nozzle; and
wherein the actuator is configured to:
   advance the steam nozzle upwardly within the garment and along a vertical axis; and
   rotate the steam nozzle about the vertical axis to deliver the first jet of steam across the interior surface of the garment.

4. The laundry kiosk of claim 1:
further comprising a mounting dock arranged within the enclosure above the steam nozzle; and
wherein the hanger is configured to magnetically couple to the mounting dock.

5. The laundry kiosk of claim 1, further comprising a set of clips arranged below the hanger, each clip in the set of clips:
coupled to a base of the enclosure via a retractable cable; and
configured to:
   transiently couple to a bottom edge of the garment; and
   tension the garment against the hanger.

6. The laundry kiosk of claim 1:
wherein the hanger comprises:
   a center section;
   a left wing extending from the center section; and
   a right wing extending from the center section opposite the left wing; and
further comprising:
   a left expandable component:
      arranged on the left wing of the hanger; and
      configured to:
         expand into the left sleeve of the garment arranged on the hanger; and
         block passage of steam from inside a torso of the garment into the left sleeve of the garment; and
   a right expandable component:
      arranged on the right wing of the hanger; and
      configured to:
         expand into the right sleeve of the garment arranged on the hanger; and
         block passage of steam from inside the torso of the garment into the right sleeve of the garment.

7. The laundry kiosk of claim 6, further comprising:
a pumping device fluidly coupled to the left expandable component and to the right expandable component; and
a controller configured to:
   access a garment type of the garment; and
   in response to the garment type identifying the garment as a sleeved shirt, trigger the pumping device to:

direct fluid into the left expandable component to expand the left expandable component within the left sleeve of the garment; and direct fluid into the right expandable component to expand the right expandable component within the right sleeve of the garment.

8. The laundry kiosk of claim 7:

further comprising a pressure sensor configured to output a signal representing pressure within the left expandable component; and wherein the controller is configured to:
in response to the signal indicating pressure within the left expandable component exceeding a pressure threshold, deactivate the pumping device.

9. The laundry kiosk of claim 1:

further comprising:
a steam generator:
a second steam nozzle:
arranged on the left sleeve retainer; and
configured to:
receive steam from the steam generator; and
expel a second jet of steam within the left sleeve of the garment to release wrinkles within the left sleeve of the garment;
a third steam nozzle:
arranged on the right sleeve retainer; and
configured to:
receive steam from the steam generator; and
expel a third jet of steam within the right sleeve of the garment to release wrinkles within the right sleeve of the garment;
wherein the steam nozzle is further configured to receive steam from the steam generator.

10. The laundry kiosk of claim 1, further comprising:

a steam generator configured to supply steam to the steam nozzle;
an air inlet arranged on the enclosure; and
a drying assembly comprising:
a heat exchanger:
interposed between the steam generator and the steam nozzle; and
configured to transfer energy from steam, received from the steam generator, to air, entering the enclosure via the air inlet; and
a set of dryer nozzles:
arranged within the enclosure; and
configured to channel air from the heat exchanger toward the garment to dry the garment.

11. The laundry kiosk of claim 1, further comprising a linear slide:

supporting the hanger within the enclosure and over the steam nozzle;
extending laterally toward the left sleeve retainer and toward the right sleeve retainer; and
configured to:
traverse the hanger rightward to tension the left sleeve of the garment between the left sleeve retainer and the hanger; and
traverse the hanger leftward to tension the right sleeve of the garment between the right sleeve retainer and the hanger.

12. A laundry kiosk comprising:

an enclosure;
a hanger arranged within the enclosure and configured to receive a garment, the hanger comprising:
a center section;
a left wing extending from the center section; and
a right wing extending from the center section opposite the left wing;
a left expandable component:
arranged on the left wing of the hanger; and
configured to:
expand into a left sleeve of the garment arranged on the hanger; and
block passage of steam from inside a torso of the garment into the left sleeve of the garment; and
a right expandable component:
arranged on the right wing of the hanger; and
configured to:
expand into a right sleeve of the garment arranged on the hanger; and
block passage of steam from inside the torso of the garment into the right sleeve of the garment;
a set of clips arranged below the hanger, each clip in the set of clips:
coupled to a base of the enclosure via a retractable cable; and
configured to:
transiently couple to a bottom edge of the garment; and
tension the garment against the hanger;
a steam nozzle:
arranged below the hanger; and
configured to expel a first jet of steam along a nozzle axis and toward an interior surface of the garment to:
tension a local area of the garment; and
release wrinkles within the local area of the garment;
an actuator configured to traverse the steam axis of the steam nozzle across the interior surface of the garment; and
a steam generator configured to deliver steam to the steam nozzle.

13. The laundry kiosk of claim 12, further comprising:

a pumping device fluidly coupled to the left expandable component and the right expandable component; and
a controller configured to:
access a garment type of the garment; and
in response to the garment type identifying the garment as a sleeved shirt trigger the pumping device to:
direct fluid into the left expandable component to expand the left expandable component within the left sleeve of the garment; and
direct fluid into the right expandable component to expand the right expandable component within the right sleeve of the garment.

14. The laundry kiosk of claim 13:

further comprising a pressure sensor configured to output a signal representing pressure within the left expandable component; and
wherein the controller is configured to:
in response to the signal indicating pressure within the left expandable component exceeding a pressure threshold, deactivate the pumping device.

15. The laundry kiosk of claim 12, further comprising:

a left sleeve retainer:
arranged:
within the enclosure;
below the hanger; and
proximal a left side of the enclosure; and
configured to:
clamp the left sleeve of the garment; and
tension the left sleeve of the garment against the hanger;
a right sleeve retainer:

arranged:
  within the enclosure;
  below the hanger; and
  proximal a right side of the enclosure; and
configured to:
  clamp the right sleeve of the garment; and
  tension the right sleeve of the garment against the hanger.

16. The laundry kiosk of claim 15, further comprising:
a second steam nozzle:
  arranged on the left sleeve retainer;
  configured to:
    receive steam from the steam generator; and
    expel a second jet of steam within the left sleeve of the garment to release wrinkles within the left sleeve of the garment; and
a third steam nozzle:
  arranged on the right sleeve retainer;
  configured to:
    receive steam from the steam generator; and
    expel a third jet of steam within the right sleeve of the garment to release wrinkles within the right sleeve of the garment.

17. The laundry kiosk of claim 15, further comprising a linear slide:
supporting the hanger within the enclosure and over the steam nozzle;
extending laterally toward the left sleeve retainer and toward the right sleeve retainer; and
configured to:
  traverse the hanger rightward to tension the left sleeve of the garment between the left sleeve retainer and the hanger; and
  traverse the hanger leftward to tension the right sleeve of the garment between the right sleeve retainer and the hanger.

18. The laundry kiosk of claim 12, further comprising:
an air inlet arranged on the enclosure;
a drying assembly comprising:
  a heat exchanger configured to:
    transfer energy from steam, received from the steam generator, to air, entering the enclosure via the air inlet; and
  a set of dryer nozzles:
    arranged within the enclosure; and
    configured to channel the air from the heat exchanger toward the garment to dry the garment.

19. The laundry kiosk of claim 12, wherein the actuator is configured to rotate the steam nozzle in a circular motion about two axes, orthogonal to the nozzle axis, to sweep the first jet of steam across the interior surface of the garment.

20. The laundry kiosk of claim 12, wherein the actuator is configured to:
advance the steam nozzle upwardly within the garment and along a vertical axis; and
rotate the steam nozzle about the vertical axis to deliver the first jet of steam across the interior surface of the garment.

\* \* \* \* \*